United States Patent [19]

Pease et al.

[11] Patent Number: 4,845,501
[45] Date of Patent: Jul. 4, 1989

[54] RADAR VIDEO SCAN CONVERTER

[75] Inventors: William M. Pease, Weston; Albert A. Pope, Wakefield, both of Mass.

[73] Assignee: Raytheon Company, Lexington, Mass.

[21] Appl. No.: 823,165

[22] Filed: Jan. 27, 1986

[51] Int. Cl.[4] .............................. G01S 7/04; H04N 7/01
[52] U.S. Cl. ................................................. 342/185
[58] Field of Search .............................. 342/185, 184

[56] References Cited

U.S. PATENT DOCUMENTS

| | | |
|---|---|---|
| 3,946,382 | 3/1976 | Kossiakoff et al. ............ 343/5 DP |
| 4,068,233 | 1/1978 | Pease et al. .................... 343/7 A |
| 4,106,021 | 8/1978 | Katagi ............................ 343/5 SC |
| 4,107,673 | 8/1978 | Gross et al. .................... 343/5 DP |
| 4,128,838 | 12/1978 | Brands et al. .................. 342/185 |
| 4,179,681 | 12/1979 | Zehner et al. .................. 342/185 X |
| 4,206,461 | 6/1980 | Pease et al. .................... 343/5 DP |
| 4,208,721 | 6/1980 | Eisenberg ....................... 342/185 X |
| 4,214,269 | 7/1980 | Parker et al. ................... 342/185 X |
| 4,220,969 | 9/1980 | Nitadori .......................... 342/185 |
| 4,241,412 | 12/1980 | Swain ............................. 342/185 X |
| 4,245,250 | 1/1981 | Tiemann ......................... 342/185 X |
| 4,274,095 | 6/1981 | Phipps et al. ................... 343/7 A |
| 4,275,415 | 6/1981 | Engle .............................. 342/185 X |
| 4,291,308 | 9/1981 | Provine .......................... 342/185 |
| 4,305,073 | 12/1981 | Curry, Jr. et al. .............. 342/185 |
| 4,318,183 | 3/1982 | Byington et al. ............... 364/900 |
| 4,336,539 | 6/1982 | Hendrickson .................. 342/185 X |
| 4,339,751 | 7/1982 | Pease ............................. 343/5 DP |
| 4,387,365 | 6/1983 | Berry et al. .................... 342/185 X |
| 4,412,220 | 10/1983 | Aanstoot et al. ............... 342/185 |
| 4,434,422 | 2/1984 | Kenol et al. .................... 342/185 |
| 4,434,437 | 2/1984 | Strolle et al. ................... 342/185 X |
| 4,443,797 | 4/1984 | Cramp et al. ................... 342/185 |
| 4,471,449 | 9/1984 | Leavitt et al. .................. 364/577 |
| 4,568,941 | 2/1986 | Thomas et al. ................. 342/185 |

*Primary Examiner*—Thomas H. Tarcza
*Assistant Examiner*—John B. Sotomayor
*Attorney, Agent, or Firm*—William R. Clark; Richard M. Sharkansky

[57] ABSTRACT

A marine radar system having a multi-plane video memory for storing scan-to-scan integrated video data used to raster scan the CRT. A scan converter generates cartesian or x,y addresses for the video memory and synchronous with the generation of each, x,y address, generates a range address for reading corresponding video data from an r,θ or polar memory. The x,y addresses are generated along azimuth sweeps by incrementing one coordinate by a pixel unit and the other coordinate by a trigonometric function. The unit coordinate and the trigonometric function are determined by the 45° octant in which the azimuth sweep is located. The pixel unit incremented coordinate is offset by one pixel unit from the origin of the azimuth sweep in alternate octants to address pixels along the octant boundaries and thereby avoid display artifacts.

33 Claims, 20 Drawing Sheets

| STEP | REF | X ACCUMULATION | Y ACCUMULATION | R ACCUMULATION |
|---|---|---|---|---|
| OWN SHIP ORIGIN | 0,0 | 0 | 0 | 0 |
| INITIAL OFFSET | x,y offset | 0 | -1 | 0 |
| 1 | x(0),y(0) | TAN A | 0 | COS A + SIN A |
| 2 | x(1),y(1) | 2(TAN A) | 1 | 2(COS A) + SIN A |
| 3 | x(2),y(2) | 3(TAN A) | 2 | 3(COS A) + 2(SIN A) |

FIG. 11

| STEP | REF | X ACCUMULATION | Y ACCUMULATION | R ACCUMULATION |
|---|---|---|---|---|
| OWN SHIP ORIGIN | 0,0 | 0 | 0 | 0 |
| INITIAL OFFSET | x,y offset | 0 | -1 | 0 |
| 1 | x(0),y(0) | TAN A | 0 | COS A + SIN A |
| 2 | x(1),y(1) | 2(TAN A) | 1 | 2(COS A) + 2(SIN A) |
| 3 | x(2),y(2) | 3(TAN A) | 2 | 3(COS A) + 3(SIN A) |

FIG. 13

| STEP | REF | X ACCUMULATION | Y ACCUMULATION | R ACCUMULATION |
|---|---|---|---|---|
| OWN SHIP ORIGIN | 0 | 0 | 0 | 0 |
| INITIAL OFFSET | zero offset | 0 | 0 | 0 |
| 1 | x(1),y(1) | 1 | COT A | SIN A + COS A |
| 2 | x(2),y(2) | 2 | 2(COT A) | 2(SIN A) + 2(COS A) |

FIG. 15

| OCTANT | REG 306 | S1 | REG 320 | S2 | REG 308 | REG 334 | S3 | REG 350 | REG 364 | S5 | S6 |
|---|---|---|---|---|---|---|---|---|---|---|---|
| I  0≤A<45 | y | +1 | x | +1 | TAN A | TAN(A + 1) − TAN A | SELECTS REG 320 AND REG 368 FOR FILL OPERATIONS. SELECTS REG 322 AND REG 372 FOR OTHER OPERATIONS. | COS A | SIN A | SELECTS REG 352 FOR FILL OPERATIONS. OTHERWISE, SELECTS REG 350. | SELECTS REG 364 FOR FILL OPERATIONS OR WHEN S4 INDICATES NON-COMPARISONS. OTHERWISE, SELECTS REG 360. |
| II  45≤A<90 | x | +1 | y | −1 | COT A | COT A − COT(A + 1) | | SIN A | −COS A | | |
| III  90≤A<135 | x | +1 | y | −1 | COT A | COT A − COT(A + 1) | | SIN A | −COS A | | |
| IV  135≤A<180 | y | −1 | x | −1 | −TAN A | TAN A − TAN(A + 1) | | −COS A | −SIN A | | |
| V  180≤A<225 | y | −1 | x | −1 | −TAN A | TAN A − TAN(A + 1) | | −COS A | −SIN A | | |
| VI  225≤A<270 | x | −1 | y | +1 | −COT A | COT(A + 1) − COT A | | −SIN A | COS A | | |
| VII  270≤A<315 | x | −1 | y | +1 | −COT A | COT(A + 1) − COT A | | −SIN A | COS A | | |
| VIII  315≤A<0 | y | +1 | x | +1 | TAN A | TAN(A + 1) − TAN A | | COS A | SIN A | | |

FIG. 19

RADAR DATA RECEIVED FROM TARGETS T1 AND T2 ON SCAN FROM POSITION m AND THEN FROM m+1.

RADAR DATA MAPPED INTO VIDEO MEMORY PLANE

| FTI | VIDEO | $MK_m$ | $MK_{m+1}$ |
|---|---|---|---|
| 0 | 0 | 0 | 0 |
| 0 | 0 | 1 | 1 |
| 0 | 1 | 0 | 1 |
| 0 | 1 | 1 | 1 |
| 1 | 0 | 0 | 0 |
| 1 | 0 | 1 | 0 |
| 1 | 1 | 0 | 1 |
| 1 | 1 | 1 | 1 |

FIG. 25

| LTI | $MK_{m+1}$ | $MA_m$ | $MB_m$ | $MA_{m+1}$ | $MB_{m+1}$ |
|---|---|---|---|---|---|
| 0 | 0 | 0 | 0 | | |
| 0 | 0 | 0 | 1 | | |
| 0 | 0 | 1 | 0 | | |
| 0 | 0 | 1 | 1 | UNCHANGED | |
| 0 | 1 | 0 | 0 | | |
| 0 | 1 | 0 | 1 | | |
| 0 | 1 | 1 | 0 | | |
| 0 | 1 | 1 | 1 | | |
| 1 | 0 | 0 | 0 | 0 | 0 |
| 1 | 0 | 0 | 1 | 0 | 0 |
| 1 | 0 | 1 | 0 | 0 | 1 |
| 1 | 0 | 1 | 1 | 1 | 0 |
| 1 | 1 | 0 | 0 | 0 | 1 |
| 1 | 1 | 0 | 1 | 1 | 0 |
| 1 | 1 | 1 | 0 | 1 | 1 |
| 1 | 1 | 1 | 1 | 1 | 1 |

FIG. 26

RADAR VIDEO SCAN CONVERTER

BACKGROUND OF THE INVENTION

The invention relates generally to echo receiving systems and more particularly to scan converters used to transfer the polar coordinate or range-azimuth radar video into a memory field organized in cartesian or x,y coordinates.

As is well known in the art, marine pulse radars are used to detect the presence of objects which produce echo signals from transmitted pulses. Generally, an antenna scans in azimuth while transmitting pulses. When a transmitted pulse strikes an object such as, for example, a distant ship or land, returns are received back at the antenna in time as a function of the range of the objects from which they are reflected. Accordingly, the input to the radar receiver for one transmitted pulse can be characterized as a train of echos or pulses from objects at different distances. After demodulation to remove the radar's carrier frequency, this pulse train is known as radar video. The video from each transmitted pulse is identified as data in a plurality of successive range cells or bins. The video data is therefore received in polar coordinates which means that the data in each range cell is defined by an azimuth angle and a range value.

As is well known, it is desirable to visually display the radar returns for operator interpretation. One common radar display has been the plan position indicator (PPI) wherein the video data for successive transmitted pulses are displayed in successive sweeps from the center of the polar coordinate system on a CRT with a long persistence phosphor. A serious drawback of a PPI-type display is that it is refreshed only once per revolution of the radar antenna resulting in a relatively low intensity display that is difficult to see in daylight. Because of this and other drawbacks, more recent radar systems have commonly used a raster-scan display because its refresh rate is much higher and therefore provides an intensity which can be viewed in daylight.

Because the raster scan systems generally require the data be presented to the CRT in rectangular or x,y coordinates, a scan conversion process is required to convert the polar coordinate data that is received into cartesian coordinates. In the prior art, scan converters have been used to transfer data from range-azimuth memories into memories having one-to-one or bit image correspondence with the x,y pixels or elemental display positions on a CRT. One type of prior art scan converter generates x,y and R addresses along the line defined by the azimuth angle of the present sweep so as to address x,y memory locations in a bit image memory (BIM) and, synchronously, addresses R memory locations in a memory containing the video data for the present sweep.

A method for generating x,y and R addresses has been to increment one coordinate by pixel unity and increment the other by a fraction corresponding to the trigonometric function of the side between the unity coordinate and the azimuth of the sweep. Because of the nature of trigonometric functions, it has been desirable to partition azimuth into a plurality of sectors or, more preferably 45° octants, and use appropriate trigonometric functions for each octant. A problem with this approach has been that artifacts may be generated along some of the octant boundaries.

Another problem of a scan converter is that because there are a plurality of sweep lines passing through each pixel close to own-ship, the same pixel corresponding address may be generated a plurality of times during each scan. Accordingly, the video data written into a memory location for a pixel may be overwritten when that address is generated on a subsequent sweep of the same scan. Accordingly, there may be an echo return for that pixel that is erased and therefore not displayed.

SUMMARY OF THE INVENTION

It is an object of the invention to provide improved apparatus for generating x,y coordinates along sweep lines of a scan for addressing a memory having correspondence between memory locations and elemental display positions or pixels on a raster scan display. It is also an object to generate a range address in synchronism with each x,y address, the range address being used to address video data received in polar coordinates.

It is another object that the generation of x,y coordinates be dependent on the octant of the scan in which the present sweep line is located and that no artifacts be created on the display along the octant boundaries. It is a further object to offset the origin of sweep lines in predetermined octants so that pixel corresponding addresses will be generated along the octant boundaries.

It is another object to provide a scan converter that addresses all pixel corresponding locations and does not create artifacts along octant boundaries.

It is a further object to avoid overwriting data in memory locations that are addressed more than once during a scan.

It is another object to provide resultant or composite data for each memory location that is addressed more than once per scan. It is also an object to provide scan-to-scan integration of storage locations in the memory and to modify locations in the memory in accordance with the resultant or composite data generated for the respective location for that scan. It is an object that the memory have a plurality of bits corresponding to each elemental display position or pixel on the display.

Further, it is an object to update a memory location in response to all of the data provided for that memory location during a scan.

These and other objects and advantages are provided by the invention which defines the combination of a visual display, a memory having storage locations corresponding to pixel on the visual display, means for generating addresses for storing data in the memory, the data corresponding to echo signals received by scanning a plurality of azimuths of a scan, the generating means generating at least one of said memory addresses a plurality of times during the scan, the generating means comprising means responsive to the ordering of one of the times with respect to the other of the times the one memory address is generated during the scan for providing a control signal, and means responsive to the control signal for controlling the memory. It may be preferable that the one ordering is the first time that the memory address is generated during the scan. Also, the one ordering may be the last time that the one memory address is generated during the scan. Generally, because the same pixel corresponding address may be generated on successive azimuth sweeps, the invention includes apparatus for determining whether it is the first or last time an address is generated and thereby avoids overwriting of data in the memory. The control signal may be the FIRST TIME IN or LAST TIME IN bit described hereinafter. Controlling a memory may mean controlling what and when data is written into the memory.

The invention may also be practiced by the combination of a first memory for storing in range format echo data received from an azimuth of a scan, a visual display, a second memory having storage locations corresponding to pixels on the visual display, a scan converter for generating addresses for the second memory and synchronous with the generation of each of the second memory addresses for generating an address for reading corresponding echo data out of the first memory, the scan converter generating at least one of the second memory addresses a plurality of times during a scan, the scan converter comprising means responsive to the ordering of one of the times with respect to the other of the times the one memory address is generated during the scan for providing a control signal, and means responsive to the control signal for modifying data stored in the second memory. Memories having storage locations corresponding to pixels on a visual display which are adapted for raster scan transfer have commonly been referred to as bit image memories. The memory may also have a plurality of planes wherein there are a plurality of bits which correspond to a pixel on the visual display. Bit image does not necessarily mean that the storage location corresponds to the same position on the CRT, but rather, that it corresponds to an image bit of the picture generated. Generally, the memory addresses which are generated a plurality of times during a scan are close to own-ship such that there are a plurality of sweep lines passing through a pixel. It may be preferable that the modifying means comprises means for providing resultant data in response to all of the echo data read out of the first memory for the one second memory address during a scan, means for reading the storage location in the second memory addressed by the one second memory address, and means for writing data into the storage location of the one second memory address in accordance with the resultant data and the data read out of the second memory. The second memory may define an intermediate memory between a polar coordinate memory and a bit image memory used for storing raster scan video display data for the visual display.

The invention further defines the combination of a first memory for storing in range format radar return data received from an azimuth of a scan, a visual display, a second memory having a plurality of storage locations corresponding to pixels on the visual display, a scan converter for generating addresses for the second memory and synchronous to the generation of each of the second memory addresses for generating an address for reading corresponding radar return data from the first memory, the scan converter comprising means for generating a first control signal the first time one pixel corresponding address for the second memory is generated during a scan and for generating a second control signal the last time the one pixel corresponding address is generated during the scan, a third memory having storage locations corresponding to predetermined ones of the storage locations of the second memory, means responsive to the first control signal for writing the radar return data into the third memory, and means responsive to the second control signal for modifying data stored in the second memory in accordance with the radar return data stored in the third memory.

The invention may also be practiced by the combination of a memory having storage locations addressable by cartesian coordinate addresses, means for generating the cartesian coordinate addresses for storing in the memory data corresponding to echo signals received by polar scanning a plurality of azimuths, means for generating a control signal the last time one of the cartesian coordinate addresses is generated during a scan, and means responsive to the control signal for writing data into the storage location of the memory addressed by the one address. Cartesian, rectangular, and x,y coordinates are herein used interchangeably. Generally, they define a memory having rows and columns of bits which correspond to dots or pixels which make up a picture. There may be a plurality of planes wherein there are a plurality of bits corresponding to each pixel. It may be preferable that the combination further comprise means for providing a resultant signal in response to all of the echo signals which correspond to the one cartesian coordinate address during a scan, the second memory being updated in response to the resultant signal. For example, all of the echo signals corresponding to a single pixel may be ORed and then, after all have been received, the bit image memory may be modified in accordance with the OR data.

The invention further defines the combination of a memory having storage locations addressable by x,y coordinate addresses, a scan converter for converting data corresponding to echo signals received in polar coordinates from a plurality of azimuth angles of a scan into data signals having corresponding x,y coordinate addresses, the scan converter comprising means for generating a control signal the last time one of the x,y coordinate addresses is generated during a scan, means responsive to all of the data signals which correspond to the one x,y coordinate address for providing a resultant signal, and means responsive to the control signal and the resultant signal for modifying the contents of the storage location or locations of the memory addressed by the one x,y coordinate address.

The invention may also be practiced by the method of storing echo signals received by scanning a region along successive azimuths into a rectangular coordinate memory, comprising the steps of generating sets of rectangular coordinate addresses for converting echo signals received by scanning the region along the successive azimuths into rectangular coordinate format adapted for storing in a memory having storage locations addressed by the sets of rectangular coordinate addresses, generating a resultant signal in response to a plurality of the echo signals having the same set of the rectangular coordinate addresses during a scan, and writing into the storage location or locations in the memory addressed by the same set of rectangular coordinate addresses in response to the resultant signal.

The invention further defines the method of generating x,y coordinates along successive azimuth sweeps of a polar scan having a plurality of sectors, comprising the step of offsetting the initial x,y coordinate of azimuth sweeps in predetermined ones of the plurality of sectors. The sectors may be 45° octants. The offsetting generally provides that pixels along octant boundaries are addressed so that display artifacts are avoided.

The invention may further be practiced by the method of generating x,y coordinates along successive azimuth sweeps through a plurality of sectors of a scan wherein the generation of the x,y coordinates along each of the azimuth sweeps is a function of its sector, comprising the step of offsetting in predetermined ones of the plurality of sectors the initial x,y coordinate of azimuth sweeps along which the x,y coordinates are generated.

The invention further defines the method of generating x,y coordinates for scan converting polar coordinate data received along one azimuth sweep of a plurality of successive azimuth sweeps of a scan into cartesian coordinate format, comprising the steps of loading a first storage device with a first value corresponding to one of the x,y coordinates of the origin of the azimuth sweep, loading a second storage device with a second value corresponding to the opposite of the one x,y coordinate of the origin of the azimuth sweep, offsetting the first storage device by one coordinate unit, and then successively incrementing the first storage device by one coordinate unit while synchronously incrementing the second storage device by a value corresponding to a trigonometric function. Whether or not the first storage device is offset is a function of the octant or sector of the azimuth sweep. In other words, by offsetting in predetermined sectors such as alternate octants, pixels along the sector boundaries are addressed.

The invention further defines apparatus for generating x,y coordinates for scan converting polar coordinate data received along an azimuth sweep of a plurality of azimuth sweeps of a 360° scan to cartesian coordinates, comprising a first register for storing a value corresponding to one of the cartesian coordinates in first predetermined octants of the scan and for storing a value corresponding to the opposite cartesian coordinate in second predetermined octants of the scan, a second register for storing a value corresponding to the opposite cartesian coordinate in the second predetermined octants and for storing the one cartesian coordinate in the first predetermined octants, means for loading into the first register a value corresponding to the coordinate origin of the azimuth sweep of the octant dependent coordinate to be stored in the first register, means for loading into the second register a value corresponding to the coordinate origin of the azimuth sweep of the octant dependent coordinate to be stored in the second register, means for offsetting the first register by a coordinate unit in alternate octants, and means for incrementing the first register by the coordinate unit while incrementing the second register by a trigonometric value of a coordinate unit as a function of the octant of the azimuth sweep. The offsetting may preferable be in a direction away from or opposite from the azimuth sweep. By that, it is meant offsetting along the axis of the one cartesian coordinate in a direction that does not form an acute angle with any sweeps in the octant.

The invention further defines the method of generating rectangular coordinates for scan converting data received from a plurality of successive azimuth sweeps of a scan, comprising the steps of offsetting one coordinate of a pair of rectangular coordinates corresponding to one of the azimuth sweeps of the scan, the offsetting being a function of the sector of the one azimuth sweep, and generating pairs of rectangular coordinates from the offset pair of coordinates along the azimuth sweep by sequentially incrementing the one coordinate by a coordinate unit and synchronously incrementing the opposite coordinate by a trigonometric fraction of a coordinate unit as a function of the sector.

BRIEF DESCRIPTION OF THE DRAWINGS

The foregoing objects and advantages will be more fully understood by reading the Description of the Preferred Embodiment with reference to the drawings wherein.

FIG. 11 is a table with x, y, and R accumulations from FIG. 10;

FIG. 13 is a table with x, y, and R accumulations from FIG. 12;

FIG. 15 is a table with x, y, and R accumulations for FIG. 14;

FIG. 19 is a table showing octant dependent parameters, constants, and control signals;

FIG. 25 is a table depicting the operation of PAL 420; and

FIG. 26 is a table depicting the operation of PAL 421.

DESCRIPTION OF THE PREFERRED EMBODIMENT

Figure 1:
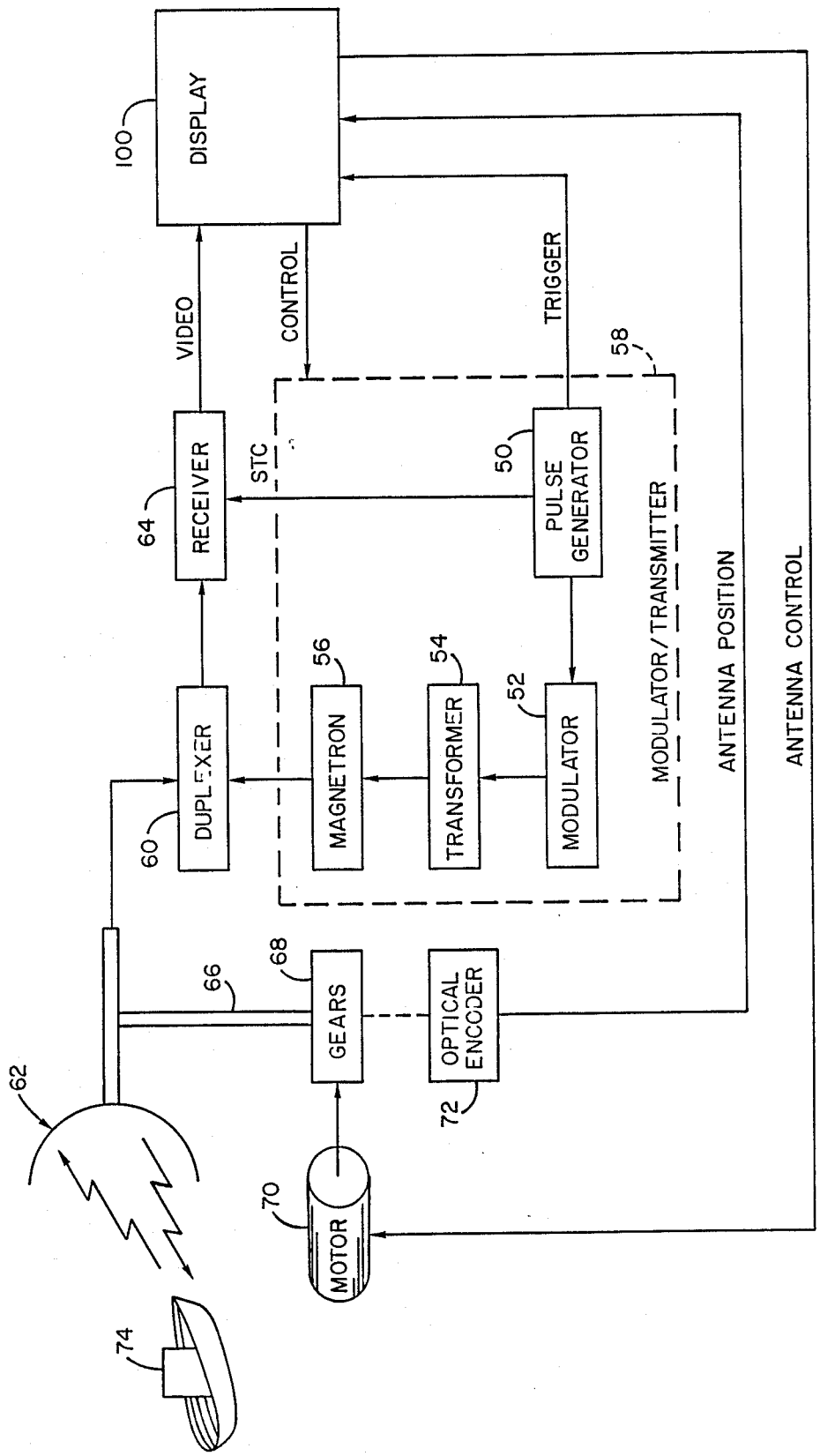
FIG. 1 is a basic block diagram of a marine radar system.

Referring to FIG. 1, there is shown a basic block diagram of a marine radar system having a display 100 operating in accordance with the invention. The transmission of a radar pulse is initiated by pulse generator 50 which simultaneously couples the radar trigger pulse to modulator 52 and display 100. The modulator 52 generates the waveform to be transmitted and couples it through transformer 54 to magnetron 56 where it is converted to pulsed microwave power. The pulse generator 50, modulator 52, transformer 54 and magnetron 56 form the modulator/transmitter 58. The duplexer 60 operates by coupling the microwave power from the modulator/transmitter 58 to the antenna 62 during one portion of the radar pulse period, and then coupling the radar return echoes from the antenna 62 to the receiver 64 during the remainder of the radar pulse period. The combination of the modulator/transmitter 58 and receiver 64 is referred to as MTR which stands for modulator/transmitter/receiver. The MTR may be mounted on the antenna pedestal or separately; in either case, the radar operational parameters of the MTR are determined by CONTROL signal from display 100.

Typically, the antenna 62 is mounted on the ship's mast (not shown) where radar pulses can be radiated clear of any on-board obstruction. The shaft 66 of the antenna 62 is connected to gears 68 which are driven by motor 70 to rotate the azimuth of the antenna 62. An ANTENNA CONTROL signal which causes the antenna to rotate is provided either directly or indirectly to motor 70 from display 100. An optical encoder 72 is coupled to gears 68 and provides display 100 with an ANTENNA POSITION signal.

When a transmitted pulse strikes an object such as, for example, a distant ship 74, an echo is reflected back to antenna 62 where it is coupled through duplexer 60 to receiver 64. The elapsed time from transmission to reception is proportional to the distance travelled. Accordingly, the input to receiver 64 for one transmitted pulse can be characterized as a train of echoes or pulses from objects at different distances. Generally, the echoes can be categorized into signals which are of interest and clutter which is not. For example, sea clutter is a result of reflections from the water and, among other things, it is dependent on the condition of the water surface which is referred to as SEA STATE. Also, rain clutter results from reflections from moisture in the air and, among other things, is dependent on the intensity of the rain. In response to an STC trigger from pulse generator 50, the sensitivity of receiver 64 is time-controlled to prevent sea and rain clutter from saturating the receiver front end under the worst conditions. After amplifying the return pulses, receiver 64 converts them to an IF; the IF amplifier is logarithmic from noise level up to a level in excess of the highest clutter returns to be encountered. Next, receiver 64 demodulates the IF to convert to a video signal which is coupled to display 100. In accordance with the invention, the operation of display 100 will be discussed in detail.

Figure 2:
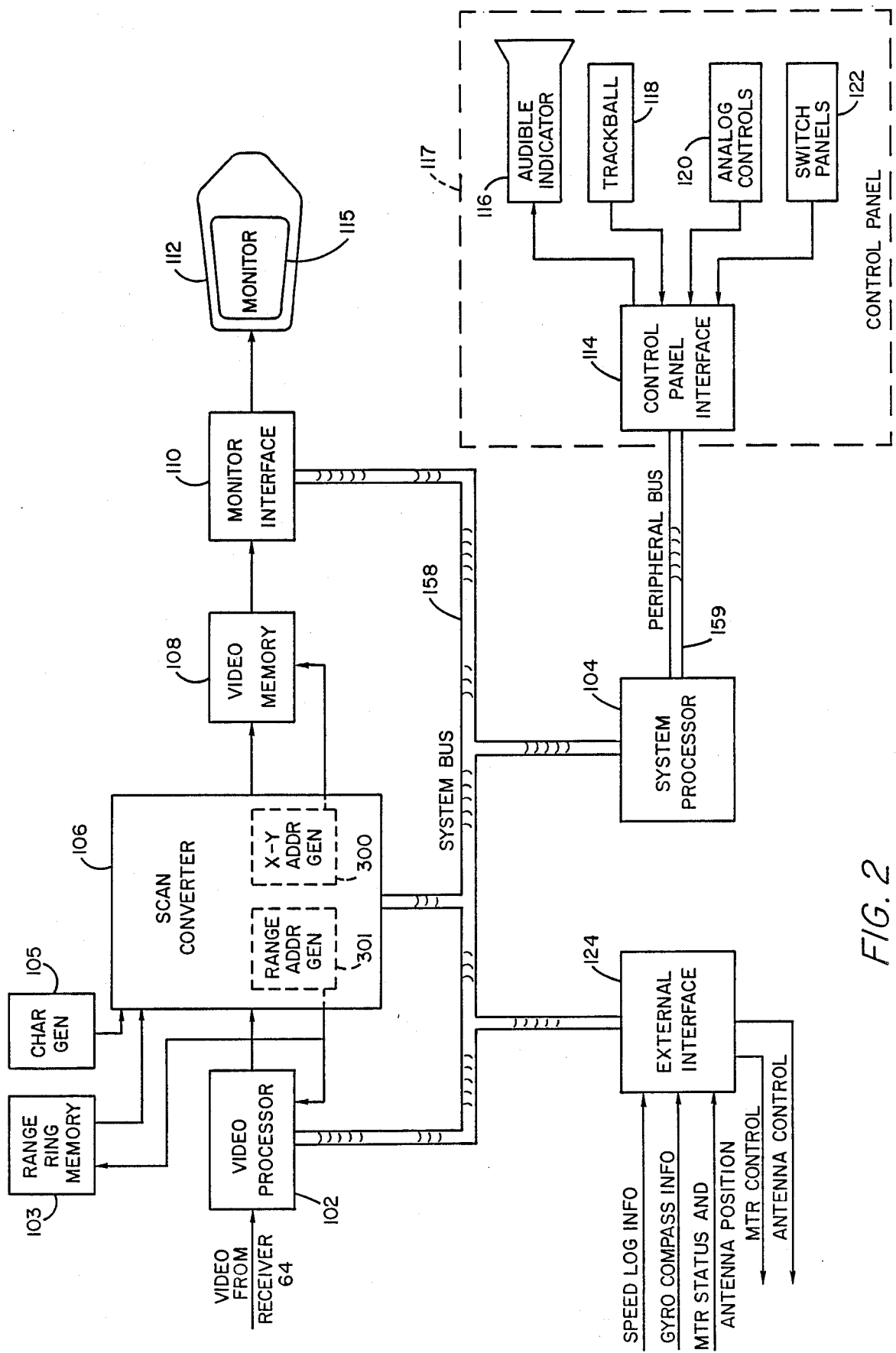
FIG. 2 is a schematic block diagram of the display of FIG. 1.

Referring to FIG. 2, there is shown a block diagram of display 100 using the invention to advantage. Display 100 is under the control of system processor 104 which communicates with the other modules using system bus 158 or peripheral bus 159. The radar video signal from receiver 64 is first received by video processor 102 which provides thresholding followed by range and azimuth correlation. The thresholding functions to remove sea and rain clutter by comparing the radar video with a range varying threshold voltage derived from mathematical model computations executed by system processor 104 for a plurality of range increments. In other words, the video signal is digitized depending on whether it is above or below a range dependent voltage that is derived from computations including radar parameters and observed sea conditions. First, however, the average or mean of sea and rain clutter is subtracted from the radar video signal and the result is filtered by a conventional filter known as an FTC circuit. After the pulse and beam integrations which are used to reduce the effects of receiver noise, the range format video for the present sweep is stored in video processor 102 for transfer to video memory 108 which stores in x,y coordinate format.

Still referring to FIG. 2, video memory 108 is organized into two planes of dynamic memory each having one bit per image pixel for radar video data and one plane of dynamic memory having one bit per image pixel for synthetic data. Each radar video plane is 768×768 cells for display on the left-hand portion of CRT screen 115 of monitor 112. The synthetics plane is 768×1024 cells for use over the entire CRT screen 115 and has a one-to-one correspondence with elemental display positions or pixels of screen 115. The right-hand portion of screen 115 may preferably be used for data read outs.

The range addresses for the video data stored in video processor 102 must be converted into X-Y addresses for transferring the video data to bit image video memory 108 which refreshes raster scan monitor 112. This scan conversion process is provided by scan converter 106. Upon receiving a conversion command from system processor 104, X-Y address generator 300 of scan converter 106 generates x-y addresses for video memory 108 based upon azimuth dependent parameters provided by system processor 104. More specifically, from the origin of the sweep line, or, more specifically, the starting x-y location defined by system processor 104, scan converter 106 generates the x,y addresses for each elemental display position or pixel bounded by the present and next successive sweep lines. As each address is provided for video memory 108, range address generator 301 of scan converter 106 generates the corresponding range address so that the video data stored in range format in video processor 102 is read for transfer to video memory 108. The range address is also provided to conventional range ring memory 103 whose output is coupled to video memory 108 via scan converter 106. Also, the output of character generator 105 is coupled through scan converter 106 for storage in the synthetic plane of video memory 108.

Still referring to FIG. 2, monitor interface 110 sequentially removes lines of data from video memory 108 and, after combining the data from the memory planes into a composite video stream, clocks the data to monitor 112 for raster scan display on screen 115. Monitor interface 110 also generates the memory refresh commands for the dynamic memory of video memory 108. Monitor 112 is a conventional raster scan CRT display monitor and may have color capability.

External interface 124 provides system processor 104 with an interface for status and control of the antenna 62 and MTR and for receiving ship signals from such sources as speed log or gyro compass.

System processor 104 communicates with the control panel interface 114 of control panel 117 using peripheral bus 159 which is dedicated to the interfacing function between them. Control panel 117 includes a track ball 118, analog controls 120 and switch panels 122 which are used to provide operator inputs. These controls are polled by the control panel interface 114 which includes a processor and the status is sent to system processor 104 upon command. System processor 104 can enable indicators on control panel 117 to indicate the status of various functions. Also, system processor 104 can sound audible indicator 116.

Figure 3:
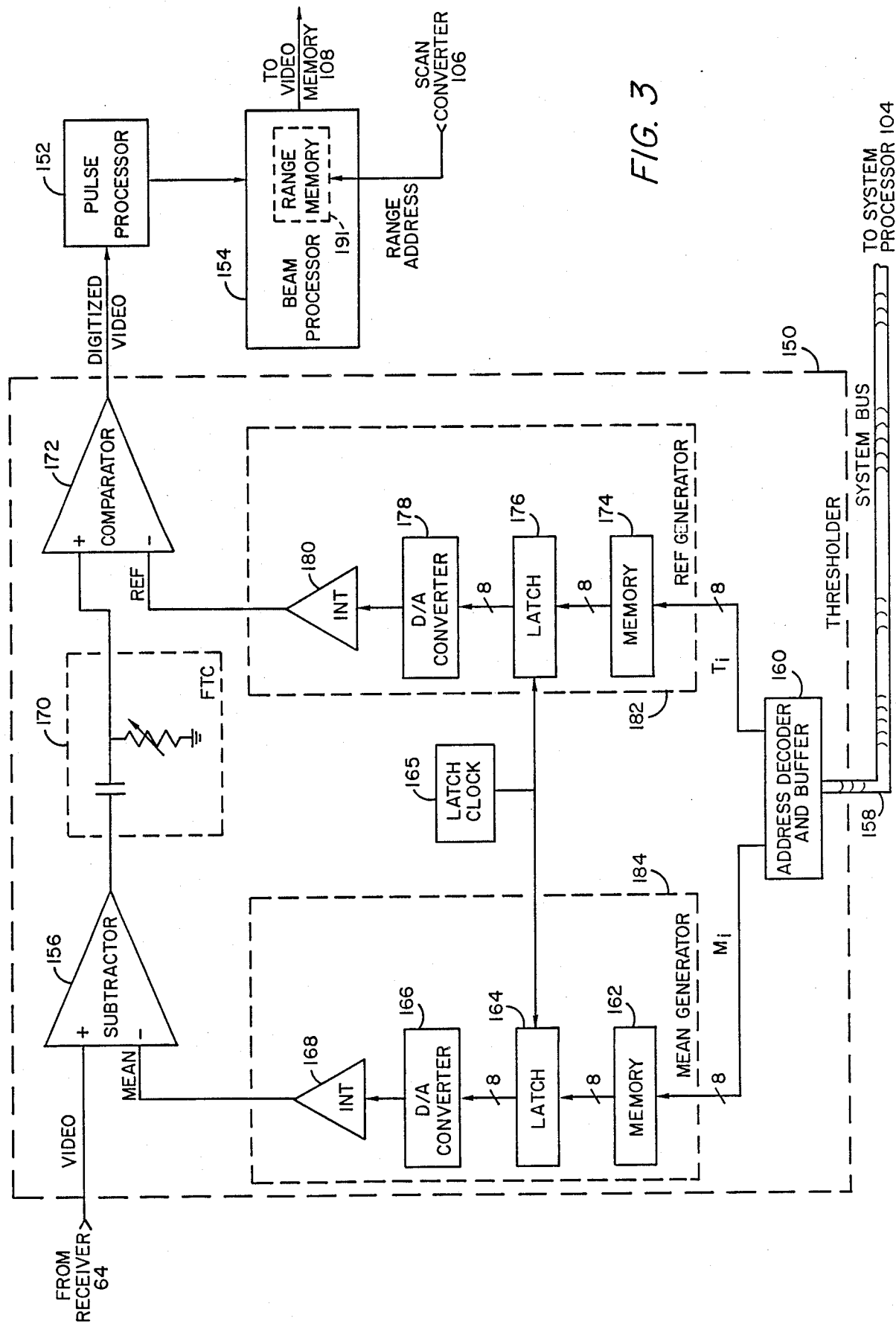
FIG. 3 is a schematic block diagram of the video processor of FIG. 2.

Referring to FIG. 3, a schematic block diagram of video processor 102 is shown. As described earlier, the video input to video processor 102 comes from receiver 64. The video can be characterized as echoes from targets of interest superimposed on or in the presence of receiver noise power $W_n$, sea clutter power $W_c$, and rain clutter power $W_r$, all herein expressed in db relative to receiver noise power. Video processor 102 includes thresholder 150, pulse processor 152, and beam processor 154 which are cascaded. The video is initially coupled to thresholder 150 whose purpose is to serve as a binary detection threshold, rejecting most of the noise and clutter while detecting radar returns of interest. Toward this purpose, thresholder 150 generates a threshold as a function of range as well as sea and rain clutter conditions and radar parameters. Accordingly, the threshold is intended to match the shape of the amplitude of the noise and clutter so that it will be high enough at certain ranges of high clutter so that strong targets won't be obscured by clutter filling the display screen 115 while being low enough at other ranges so that the signals from weak targets will exceed the threshold and be detected. Stated differently, the object of thresholder 150 is to generate a threshold such that regardless of the range to a target and the clutter conditions, if the target echo or signal is suitably larger than the clutter and noise, the echo will be above the threshold voltage and therefore visually detected while the adjacent clutter and noise are below the threshold voltage and therefore not displayed.

Still referring to FIG. 3 and also to FIG. 2, the video entering thresholder 150 is first coupled to subtractor 156 and analog MEAN voltage is subtracted from it. As will be described in detail later herein, the MEAN voltage corresponds to the range dependent average or mean of receiver noise, $W_n$, sea clutter, $W_c$, and rain clutter, $W_r$, as derived from calculations based on mathematical models. More specifically, for each transmitted pulse, system processor 104 calculates the expected mean values of sea and rain clutter for sequential range segments and combines them with the calculated noise. Although other range points of interest could be used, herein the calculations are made at 0.05 nautical miles (nm), 0.25 nm, and all ranges from 0.5 nm to 20 nm at half-mile intervals; the calculated values remain unchanged beyond 20 nm. Accordingly, 42 values for the mean $M_i$ of noise and clutter are calculated for each transmitted pulse and these 42 values are transmitted from system processor 104 on system bus 158 to thresholder 150. Address decoder and buffer 160 acts as a distributor by channeling the 42 MEAN values $M_i$ to memory 162 where they are stored. As shown, each value of $M_i$ may typically consist of an 8-bit digital word. The mean values $M_i$ are consecutively loaded by latch clock 165 into 8-bit latch 164 such that the instantaneous 8-bit value of $M_i$ stored in latch 164 corresponds to or is synchronous with the range of the video signal present at the positive input terminal of subtractor 156. For example, between 0.5 nm and 20 nm, latch clock 165 loads a new $M_i$ into latch 164 every 6 microseconds or one-half mile of range. The contents of latch 164 is converted to an analog voltage by digital to analog converter 166 and then integrated by integrator 168 to provide a straight line transition from the voltage at one range to the voltage at the next range. The output of integrator 168 is defined as the range or time varying MEAN voltage and is coupled to the negative input terminal of subtractor 156. Accordingly, the output of subtractor 156 approximates the video signal minus the MEAN voltage or function which corresponds to the mean value of the noise, sea clutter, and rain clutter. The combination of memory 162, latch 164, D/A converter 166 and integrator 168 define MEAN generator 184.

The output of subtractor 156 is coupled to high pass filter 170 which has a fast time constant and is commonly referred to as FTC. Because the range varying MEAN voltage is subtracted from the video signal by subtractor 156, improved low frequency rejection is achieved. More specifically, even though there will be some irregularities in sea and rain returns resulting in some variations in clutter at the output of subtractor 156, the variations will be relatively small since much of the large variations resulting from change in range will have already been subtracted. Accordingly, the removal of variations above and below the mean of sea and rain clutter by FTC filter 170 will be much more effective than without subtractor 156. Therefore, the residue at the output of FTC filter 170 will be much smaller than is conventionally achieved. The improvement in FTC filtering also means that the break point of the rejection frequency band of FTC filter 170 can be kept lower thereby providing for less rejection of land returns. The upper limit of the rejection frequency band is operator adjustable so as to enable balance between improved clutter rejection and enhanced land returns.

The output of FTC filter 170 is coupled to the positive terminal of comparator 172 which digitizes the video signal into binary states depending on whether the video signal is above or below the analog threshold reference voltage RE which is coupled to the negative terminal of comparator 172. Similar to the generation of the range varying MEAN voltage, the range varying REF voltage is derived from a plurality of threshold values $T_i$ which are calculated in system processor 104 for the same range segments as computed for $M_i$. More specifically, for 0.05 nm, 0.25 nm, and then 0.5 nm to 20 nm in half-mile increments, a separate value of $T_i$ is computed according to mathematical models which are dependent not only on the noise, sea clutter, and rain clutter, but also on the radar parameters to be discussed subsequently. Ideally, the threshold REF is approximately matched at all ranges to the noise and clutter at the positive input of comparator 172 thereby providing a false alarm rate that is constant over range and can be set to a desired level. The result is that the monitor 112 will display uniform speckle or a uniform false alarm rate everywhere on the CRT. Because the MEAN voltage is subtracted from the receiver video signal before comparator 172, the general approach of system processor 104 is to calculate the total desired threshold $T_i$ (total) for each range point of interest and then subtract from each the corresponding mean value $M_i$ for that particular range. Accordingly, $T_i = T_i(total) - M_i$. In an alternate embodiment where MEAN voltage is not first subtracted from the video signal from receiver 64, a threshold reference voltage would be generated directly from $T_i$ (total). Similar to the generation of the MEAN voltage, the 42 values for $T_i$, each of which may preferably consist of an 8-bit digital word, are transmitted to thresholder 150 on system bus 158. After being distributed to memory 174 by address decoder and buffer 160, the values for $T_i$ are consecutively clocked into 8-bit latch 176 by latch clock 165 at a rate corresponding to or synchronous with the video signal on the positive input terminal of comparator 172. The value for $T_i$ stored in latch 176 is converted to an analog signal by digital to analog converter 178 and integrated by integrator 180 to provide a straight line transition from the voltage at one range to the voltage at the next range. The output of integrator 180 is defined as the time or range varying reference REF voltage that is coupled to the negative input of comparator 172. The combination of memory 174, latch 176, D/A converter 178 and integrator 180 define REF generator 182.

The digitized video data is coupled from thresholder 150 to conventional pulse processor 152 which provides signal-to-noise enhancement by binary integration in a sliding window. Methods are well known for providing sliding window M/N integration, where N is the number of samples considered, and M is the number of samples that equal or exceed the threshold set.

The output of pulse processor 152 is coupled to beam processor 154 which provides sweep-to-sweep signal-to-noise enhancement using a sliding azimuth window M/N integrator for each range cell. Range memory 191 stores processed video data for one sweep which may, for example, include 720 range cells, each of which is updated as new video data is received and becomes available.

For each transmitted pulse, system processor 104 uses equations based on mathematical models to calculate for each range point of interest the predicted average or mean $M_i$ of noise, sea clutter, and rain clutter where "i" denotes the range here including 0.05, 0.25 and then from 0.5 to 20 nautical miles in half-mile increments. For each range point of interest, system processor 104 also calculates an adjustable threshold $T_i$ above $M_i$ for providing uniform speckle or false alarm rate. There are many well-known models and equations which could be used to calculate $M_i$ and $T_i$. For reference, see "Radar Range-Performance Analysis" by Blake, D.C. Heath Company 1980 or "Radar Handbook" by Skolnik, McGraw-Hill 1970. For illustration, a preferred computational method will be described. First, the radar parameters that are used in the computations are pulse width $\tau$ in microseconds, noise bandwidth B in megahertz, beam width $\theta$ in degrees, beam height $\phi$ in degrees, wavelength $\lambda$ in centimeters, repetition frequency f in pulses per second, antenna height H in meters, antenna rate $\Omega$ in rpm, reference range $R_0$ in nautical miles, and range scale RS in nautical miles. $R_0$ is defined as the free space range at which one square meter target centered on the antenna beam will produce for each single pulse a return whose power is equal to the mean receiver noise power. These radar parameters are a function of the particular radar used and its operational settings. Tables of radar parameters having constant values are stored in system processor 104. The others are determined from the operator settings of control panel 117. Other parameters used in the computations are SEA STATE, SS, which is a conventional numerical value corresponding to the surface condition of the water; RAIN RATE, RR, in millimeters per hour; and GAIN control, GC, which is a numerical value between 0 and 1.0.

Figure 4:
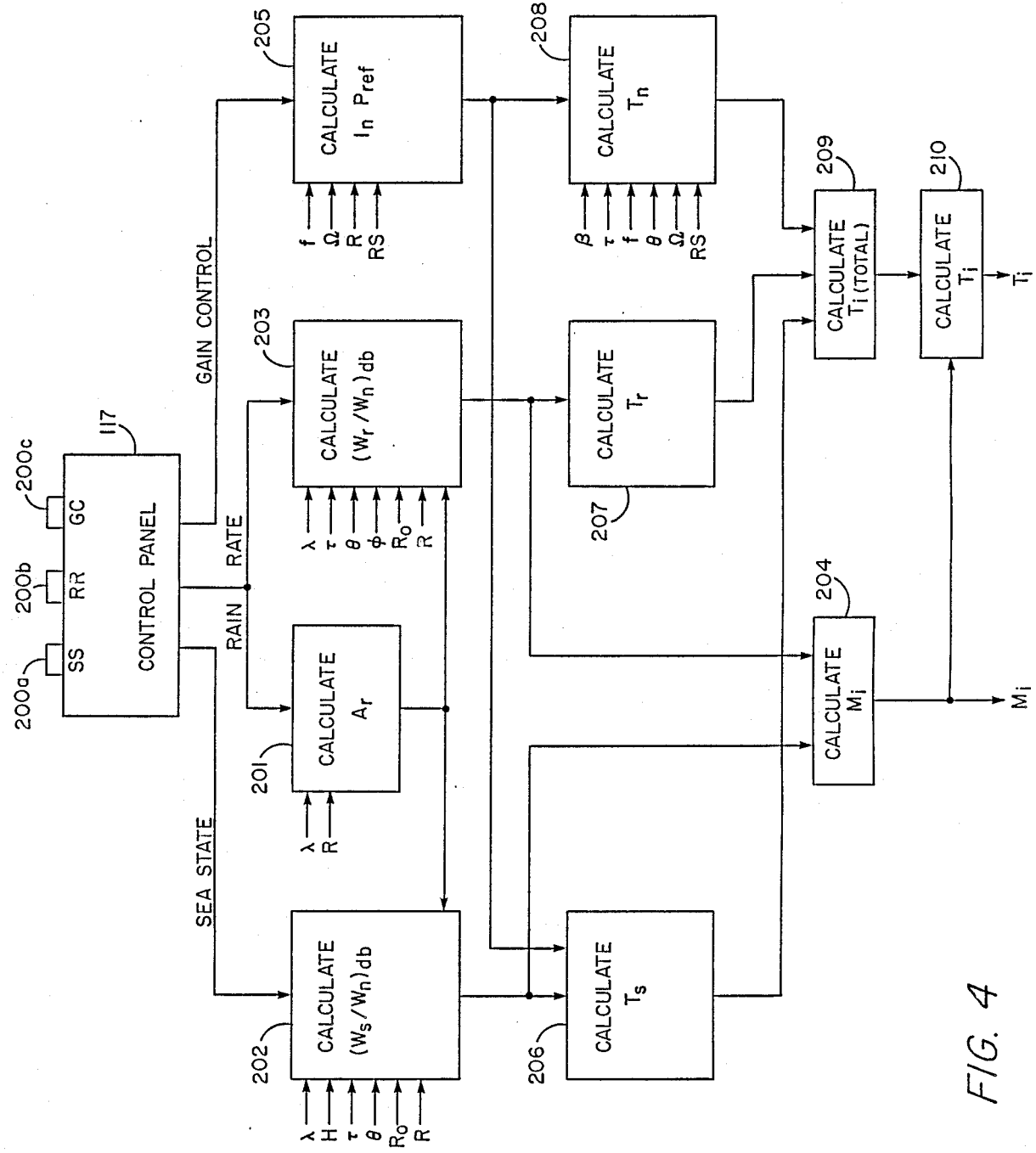
FIG. 4 is a flow diagram illustrating the calculation of $M_i$ and $T_i$.

Referring to FIG. 4, there is shown a flow diagram that illustrates the process by which system processor 104 here calculates $M_i$ and $T_i$ for each range point of interest. In accordance with the operator's evaluation of the water surface conditions, the SEA STATE is entered through control panel 117 using SS control knob 200a. Further, in accordance with the operator's evaluation of the rain conditions, the RAIN RATE is entered through control panel 117 using RR control knob 200b. Also, in accordance with the desired false alarm rate or speckle to appear on screen 115, the GAIN CONTROL is entered through control panel 117 using GC control knob 200c. Control knobs 200a-c may typically be included within either analog controls 120 or switch panel 122.

Still referring to FIG. 4, the first step in the calculation process as depicted in block 201 is to calculate for each range point the rain attenuation, $A_r$.

$$A_r = ar^b R \tag{1}$$

where r is the RAIN RATE entered through RR control knob 200b, R is the range, $$a = (0.321/\lambda)^2 ((1+(10/\lambda)^2/(1+1.10/\lambda)^2))^{\frac{1}{2}} \tag{2}$$

and $$b = 1.30 + 0.0372(1-(1+(16.7 \log(3/\lambda))^2)^{\frac{1}{2}}) \tag{3}$$

where $\lambda$ has been defined earlier. The second step as depicted by block 202 is to calculate for each of the range points the mean sea clutter return power $W_s$ relative to the receiver noise power $W_n$. Herein, $$(W_s/W_n)_{db} = (\sigma^o)_{dbsm} + 10 \log(4849 \, \tau \theta R_o)$$
$$-30 \log(R/R_o) - A_r \tag{4}$$

where the parameter $(\sigma_o)_{dbsm}$ is derived from experimental data. Although such data has been taken by many investigators and is available from many sources, one preferable source is published in "Radar Design Principles" by Nathanson, 1969, Tables 7-1 through 7-8. $(\sigma_o)_{dbsm}$ is dependent on the SEA STATE entered through SS control knob 200a and may preferable be provided from a look-up table. All of the other calculation parameters have been defined earlier herein.

The third step as depicted by block 203 of FIG. 4 is to calculate, for each range point, the mean rain clutter return power $W_r$ relative to the receiver noise power $W_n$. Herein, $$(W_r/W_n)_{db} = 10 \log(0.30 \times 10^{-4} \phi \theta (10/\lambda)^4)$$
$$+ 10 \log(\tau r^{1.6} R_o^2) - 20 \log(R/R_o) - A_r \tag{5}$$

where all of the parameters have previously been defined. In the above calculations, it is noted that for the very short ranges, namely 0.05 and 0.25 nm, it is preferable to provide a correction for the nonuniform illumination across the illuminated patch of sea.

The fourth step as depicted by block 204 of FIG. 4 is to combine the respective sea and rain clutter powers for each of the 42 range points of interest into a total power $M_i$ for each range point as expressed in db relative to receiver noise power. Herein, $$M_i = 10 \log(1 + 10^{(1/10)(W_s/W_n)db} + 10^{(1/10)(W_r/W_r)db}) \tag{6}$$

As shown, the $(W_s/W_n)_{db}$ and $(W_r/W_r)_{db}$ terms come from blocks 202 and 203, respectively.

The fifth step as shown in block 205 of FIG. 4 is to calculate for each range point the reference parameter, ln $P_{ref}$ which corresponds to the desired false alarm rate or speckle density mentioned earlier. Herein, $$\ln P_{ref} = \ln(S/50) - \ln(21.6f/\Omega) + \ln(R/RS) \tag{7}$$

where S is the speckle density or the probability of false alarm per scan, and the other terms have been defined earlier herein. S is determined by GAIN CONTROL as entered through control panel 117 using GC control knob 200c. Preferably, the interval $0 < \ln(S/50) < \ln 10$ linearly corresponds to $100 > GC > 0$ where GC is the GC control knob 200c rotation in percent of maximum.

The sixth step as shown in block 206 of FIG. 4 is to calculate, for each of the range points, a value $T_S$ which is the threshold which will be exceeded by sea clutter in the absence of rain clutter and receiver noise with a probability of $P_{ref}$. Although other equations could be used, herein, the following well-known log-normal distribution formula was used.

$$T_s = (W_s/W_n)_{db} + \sigma_{db} x - 0.11513 \sigma_{db} \quad (8)$$

wherein $\sigma_{db}$ is determined experimentally and is usually in the range of 3.0 to 6.0; herein, a value of 4.0 was used. Further, using the value $\ln P_{ref}$ from equation (7) above, x is determined from equation (9) below.

$$\ln P_{ref} = \ln(1/2 - (1/2\pi)^{1/2} \int_0^x \exp(-x^2/2) dx) \quad (9)$$

A preferable method to attain x is to use a table of values relating $\ln P_{ref}$ to x together with linear interpolation. As shown, $(W_s/W_n)_{db}$ and $\ln P_{ref}$ are obtained from blocks 202 and 205, respectively.

The seventh step as shown in block 207 of FIG. 4 is to calculate, for each of the range points, a value $T_r$ which is the threshold which will be exceeded by rain clutter in the absence of sea clutter and receiver noise with a probability of $P_{ref}$. Although other equations could be used, herein $$T_r = (W_r/W_n)_{db} + 10 \log \ln(1/P_{ref}) \quad (10)$$

As shown, $(W_r/W_n)_{db}$ and $P_{ref}$ are obtained from blocks 203 and 205, respectively.

The eighth step as shown in block 208 of FIG. 4 is to calculate, for each of the range points, a value $T_n$ which is the threshold which will be exceeded by noise in the absence of sea clutter and rain clutter with a probability of $P_{ref}$. The probability $P_{ref}$ of noise exceeding the threshold is reduced to $P_n$ by two M/N processing stages, and in pulse processor 152 and one in beam processor 154. Accordingly, here $$T_n = 10 \log \ln(1/P_n) \quad (11)$$

wherein $P_n$ is derived from $P_{ref}$ and takes into consideration that the probability of noise exceeding a threshold is much smaller after the M/N processing stages. Various equations or tables could be used to determine $P_n$ from $P_{ref}$; generally, the computation parameters depend on $\beta, \tau, f, \theta, \Omega$, and RS.

The ninth step as shown in block 209 of FIG. 4 is to calculate for each range point the total threshold $T_i$ (total) using $T_c$, $T_r$ and $T_n$ from blocks 206, 207, and 208, respectively. Although other equations could be used, herein $$T_i(total) = 5 \log(10^{1/5 T_n} + 10^{1/5 T_r} + 10^{1/5 T_s}) \quad (12)$$

Finally, the last step as shown in block 210 of FIG. 4, is to calculate, for each of the range points a value $T_i$ which subtracts the respective $M_i$ value from each of the total threshold values $T_i$(total) because the MEAN voltage is subtracted from the video by subtractor 156. Herein, $$T_i = 32 \; 10 \log(10^{1/10 T_i(total)} - 10^{1/10 M_i}) \quad (13)$$

As described earlier, the $M_i$ and $T_i$ values for each of the range points, here 0.05nm, 0.25nm, and then 0.5nm to 20nm in half nm increments, are transferred from system processor 104 to thresholder 150 for generation of MEAN and REF time varying voltages.

Figure 5:
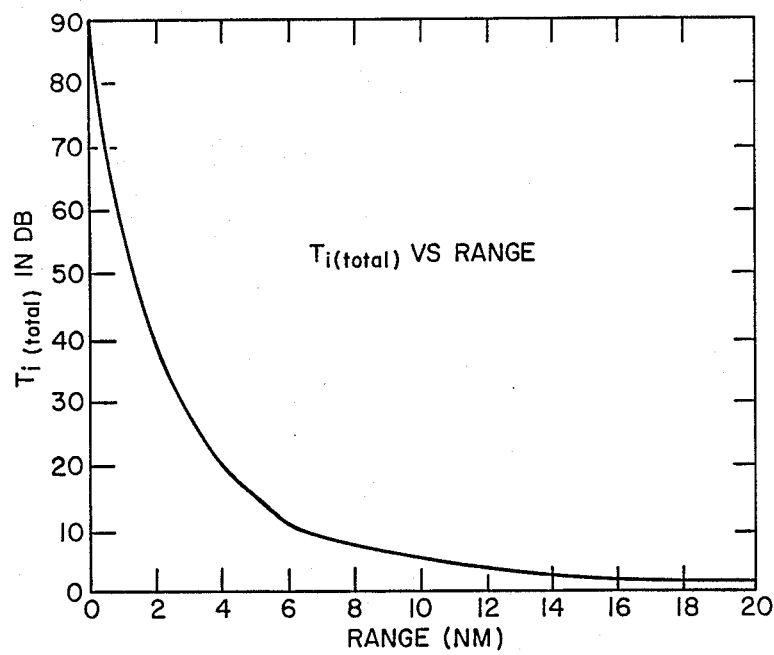
FIG. 5 is an illustrative curve depicting the plot of total threshold values $T_i$ (total) versus range.
Figure 6:
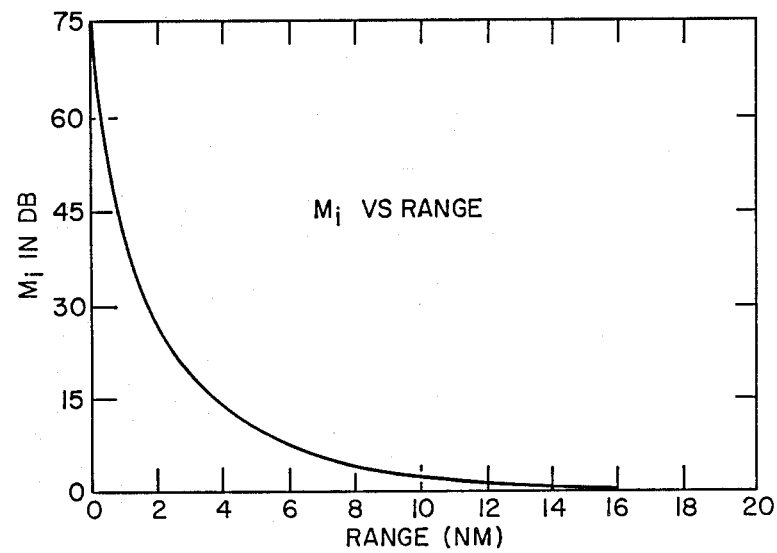
FIG. 6 is an illustrative curve depicting the plot of the calculated mean values $M_i$ versus range.
Figure 7:
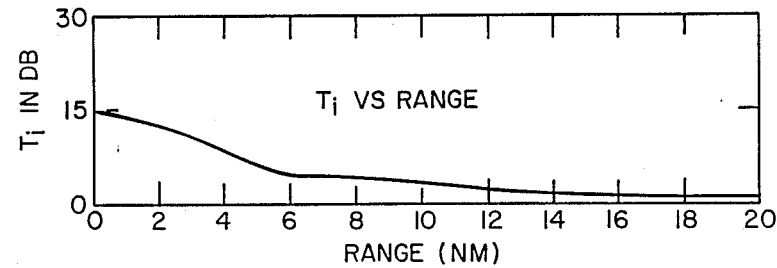
FIG. 7 is an illustrative curve depicting the plot of calculated threshold values $T_i$ versus range.

Referring to FIG. 5, there is shown an illustrative curve depicting the plot of the total threshold values $T_i$ (total) calculated in db relative to receiver noise power out to 20 nm for $\tau = 0.75$ μsec, B=4.0 MHz, $\theta = 2.0°$, $\phi = 24.0°$, $\lambda = 10$ cm, f=1 KHz, H=20 m, $\Omega = 18$ rpm, $R_0 = 9.3$ nm, RS=3.0 nm, Sea State=5, Rain Rate=4.0 mm/hr, and Gain Control=0.5. FIG. 6 is an illustrative curve depicting the plot of the calculated mean values $M_i$ for receiver noise, sea clutter and rain clutter for the same input parameters of FIG. 5. FIG. 7 is an illustrative curve depicting the plot of calculated threshold values $T_i$ for the same input data of FIG. 5.

As briefly described earlier herein, scan converter 106 reformats the range/azimuth video data into cartesian coordinates for storage in bit-image format for raster scanning. Before turning to the hardware implementation, the operative principles of scan converter 106 will be described in detail. Antenna 62 rotates in azimuth providing video range data for successive transmitted pulses. The video data used to update screen 115 is selected at some angular interval such as, for example, $\frac{1}{8}°$. Range memory 191 of video processor 102 stores the current video data and is continuously updated as new video data arrives. Video memory 108 is a bit image or pixel memory which means that there is at least one data bit stored for each elemental display position or pixel on the video portion of screen 115. Here, there are two video memory planes so there are two bits corresponding to each elemental display position or pixel. Although each pixel corresponds to an x,y address in video memory 108, a pixel herein is defined as a square area having unit sides.

Figure 8:
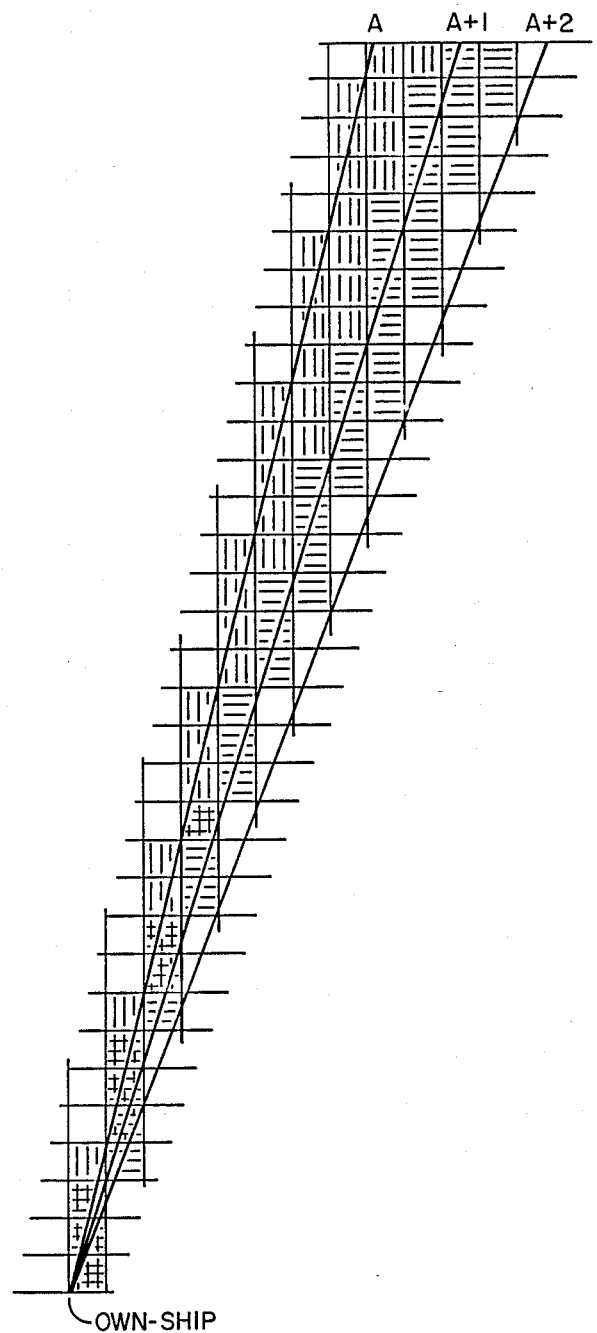
FIG. 8 shows consecutive sweep lines at angles A, A+1, and A+2 from own-ship.

In general, system processor 104 provides scan converter 106 with information derived from the position of own-ship relative to a stationary reference, the azimuth of the current sweep line (angle A) and the azimuth of the next sweep line (angle A+1). Referring to FIG. 8, there are shown sweep lines at angle A, angle A+1, and angle A+2 from own-ship. The video pixels shown in FIG. 8 are illustrative only; generally, there would be far more video pixels such as 768 rows and 768 columns as described earlier herein. Generally, if the current sweep line (angle A) passes through the "working side" of a pixel, x-y coordinate address generator 300 generates the x,y address for video memory 108 corresponding to that pixel. Although other conventions could be used, "working side" herein is defined as the side of the pixel closest to own-ship in the direction of the sweep of interest. Also, X-Y coordinate address generator 300 provides an x,y address corresponding to each pixel between angle A and angle A+1 that will not be addressed by sweep line angle A+1 (does not have angle A+1 passing through its "working side"). The addressing of pixels between the sweep lines is defined as fill operations. For example, referring to FIG. 8, x-y coordinate address generator 300 would sequentially generate addresses for the vertically shaded pixels for sweep angle A because the sweep line for angle A either passes through each pixel's "working side" or because the "working side" of each pixel is between angle A and angle A+1 and therefore subject to a fill operation. Similarly, for angle A+1, X-Y coordinate address generator 301 will generate x,y addresses for the horizontally shaded pixels because angle A+1 either passes through the pixel's "working side" or the pixel is subject to a fill operation because its "working side" is between angle A+1 and angle A+2. It can be seen that under the above-described conditions, each pixel will be addressed at least once during a scan; in other words, there will be no "holes" in the scan conversion process. Generally, there will be a plurality of sweep lines passing through each pixel close to own-ship which is the origin of the sweep lines as illustrated by the overlap of vertical and horizontal shading. Accordingly, pixels close to own-ship will generally be addressed more than once during a scan. It follows that there won't be any fill operations in this region close to own-ship. On the other hand, there generally will be a plurality of pixels between successive sweep lines adjacent to the perimeter of the CRT screen 115 so there will be fill operations in the far region.

For each x,y address generated by the X-Y coordinate address generator 300, range address generator 301 generates a range address corresponding to the range to that pixel. The range address is used to address a range bin or range cell in range memory 191 to transfer video data into the cartesian coordinate format of video memory 108.

Generally, X-Y coordinate address generator 300 generates x,y addresses arithmetically by incrementing and accumulating. Generally, the increment in one direction corresponds to a pixel unit and the increment in the orthogonal direction corresponds to a fraction of a pixel unit defined by the appropriate trigonometric function. The unit incrementer or decrementer and the fractional or trigonometric function are determined by the octant containing sweep angle A. More specifically, referring to FIG. 9, azimuth is divided into eight 45° octants I-VIII, respectively labelled by clockwise rotation from true north. As can be seen and as will be described in detail later herein, the vertex of octants I, III, V, and VII are offset from own-ship origin on the unit incrementing axis by one pixel so that the octant boundaries overlap to eliminate an artifact along the diagonal octant boundaries. In octants I, IV, V and VIII, unit increments or decrements are along the y axis while fractional or trigonometric function increments or decrements are along the x axis; in these octants, fill operations are also along the x axis or rows. In octants II, III, VI and VII, unit increments or decrements are along the x axis while fractional or trigonometric function increments or decrements are on the y axis; in these octants, fill operations are also along the y axis or columns. Here, fill operations are always in the clockwise direction.

Figure 10:
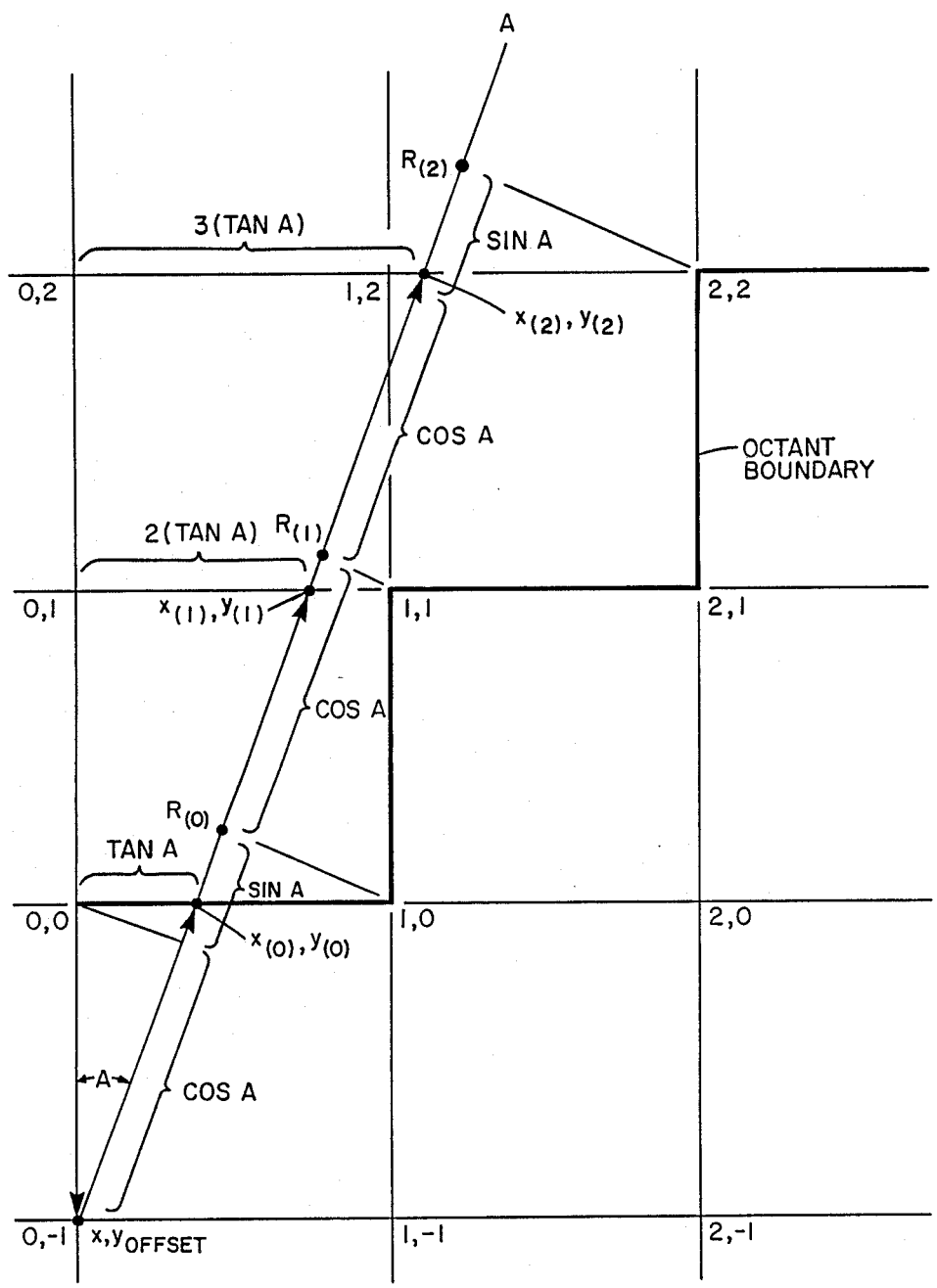
FIG. 10 shows sweep angle A in octant I.
Figure 12:
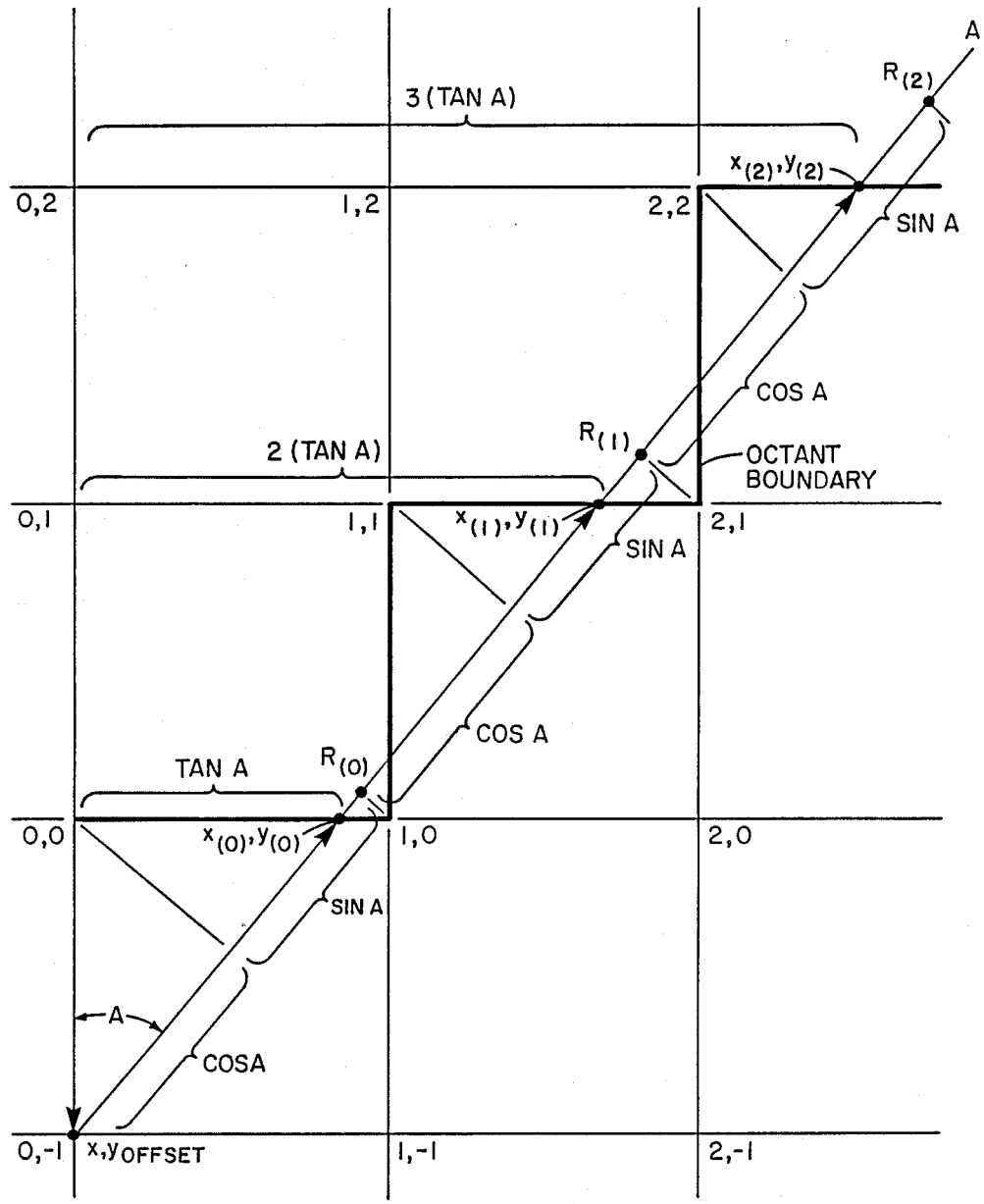
FIG. 12 shows sweep line A approaching 45° in octant I.
Figure 14:
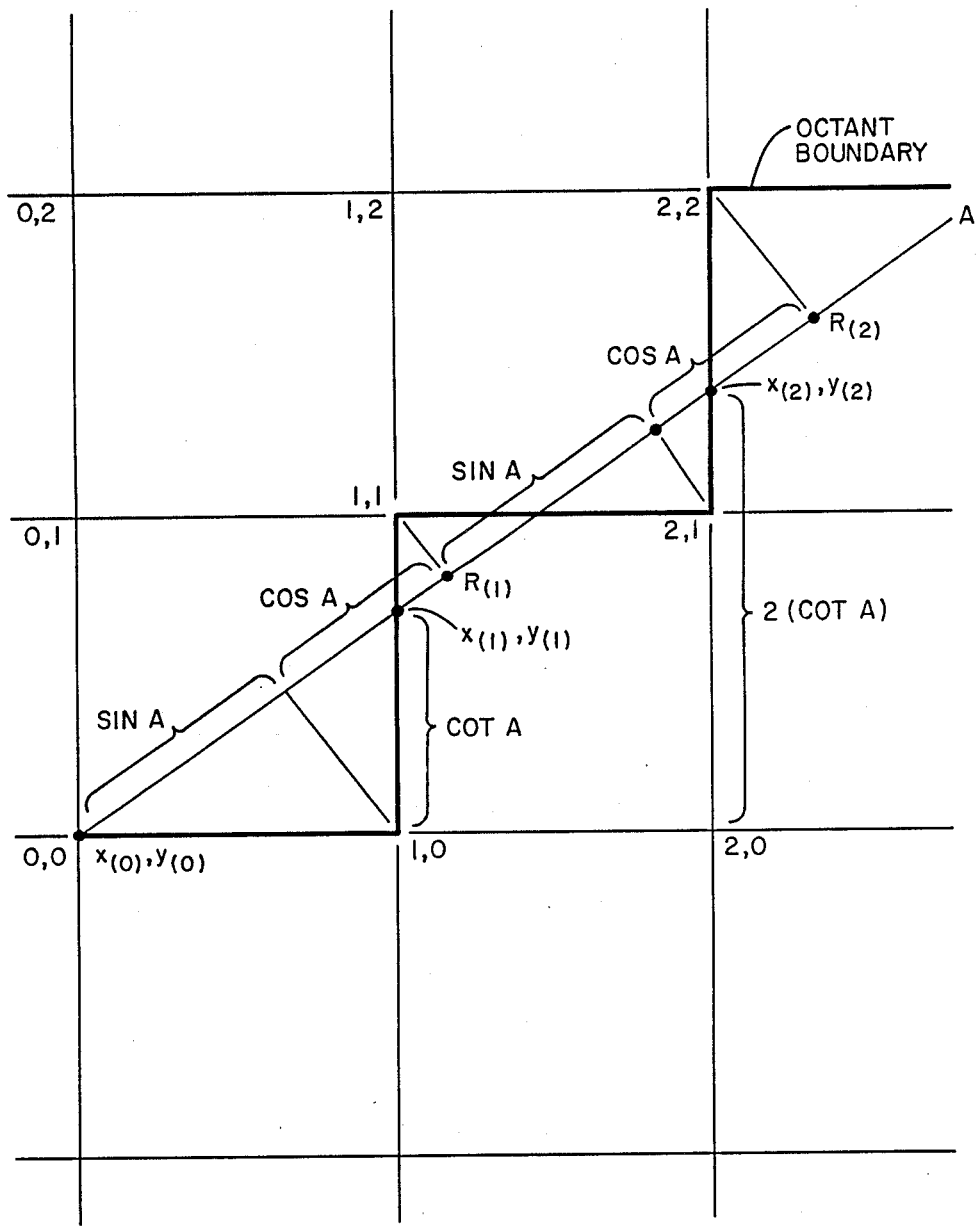
FIG. 14 shows sweep angle A in octant II.
Figure 16:
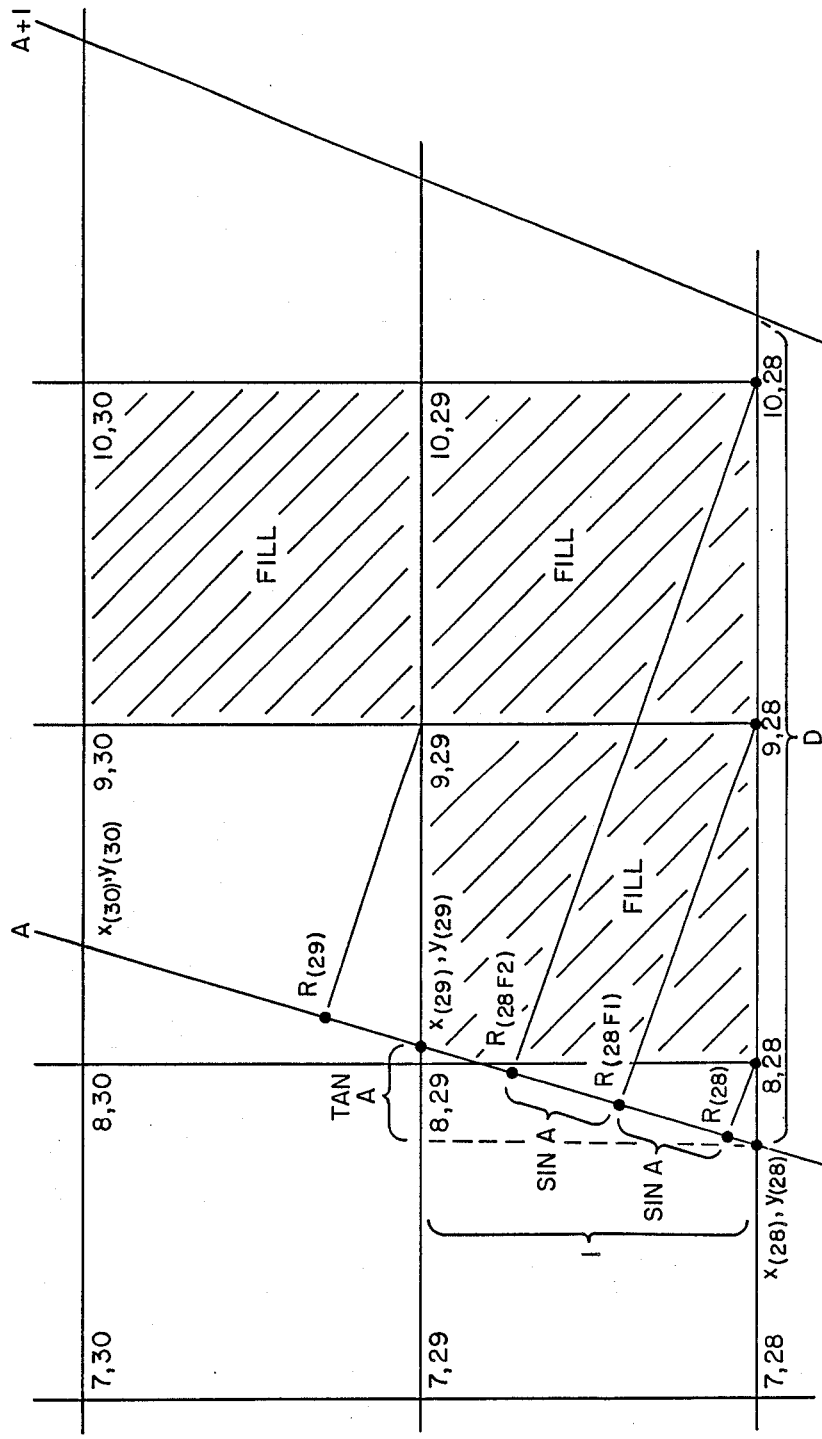
FIG. 16 depicts fill operations.

Referring to FIG. 10, there is shown a sweep angle A in octant I intersecting pixels near own-ship which is the origin of the sweep lines; for simplicity of explanation with respect to FIG. 10 as well as FIGS. 12, 14 and 16, the position of own-ship is identified as 0,0. However, in actual practice, own-ship moves with respect to the origin of the x-y or rectangular coordinate system of video memory 108 which is fixed or stationary; accordingly, the coordinates of own-ship are actually dynamic and system processor 104 determines the displacement in x and y for own-ship from the coordinate system origin and initiates the subsequently described increment accumulations from these displaced values. In other words, although the storage of data in video memory 108 is true motion stabilized with respect to a fixed origin other than own-ship, the initial description of scan converter 106 is simplified by using a relative coordinate system in which own-ship is at 0,0.

Referring to FIG. 11, the initial parameters for the example of FIG. 10 as provided by system processor 104 are $x=0$, $y=0$, $R=0$. Initially, y is decremented by one pixel unit to eliminate a boundary artifact between octant I and octant II as will be described in detail later herein. Accordingly, x,y offset is at 0,−1 and $R=0$. In the first step, y is incremented by 1 and x is incremented by TAN A, as shown, to move to $x_{(0)}$, $y_{(0)}$ on the "working side" of the pixel here identified as 0,0. The x,y address is generated from the x and y accumulations using only the integer part so an address corresponding to pixel 0,0 is provided. The range $R_{(0)}$ to this pixel is defined by COS A+SIN A, as shown. Next, because there are no fill operations possible on this row, y is again incremented by 1 and x is incremented by TAN A to move to $x_{(1)}$, $y_{(1)}$ on the next "working side". Accordingly, as accumulated, $x_{(1)}=2(TAN\ A)$ and $y_{(1)}=1$. It follows that an address for pixel 0,1 is generated. The range $R_{(1)}$ to this pixel is generated by incrementing by COS A to accumulate $2(COS\ A)+SIN\ A$. Next, because there are no fill operations on this row, y is again incremented by 1 and x is incremented by TAN A to move to $x_{(2)}$, $y_{(2)}$ on the next "working side". Accordingly, as accumulated, $x_{(2)}=3(TAN\ A)$ and $y_{(2)}=2$. It follows that the address for pixel 1,2 is generated. The range $R_{(2)}$ to this pixel is generated by incrementing $R_{(1)}$ by SIN A+COS A. It is noted that for octant I, the rule is that range is always incremented by COS A and, if a y axis is crossed (x integer part is incremented), it is also incremented by SIN A.

Referring to FIG. 12, there is shown a sweep line in octant I as angle A approaches 45°. FIG. 13 shows the x,y and R accumulations for the various steps and, it can be seen that they are similar to FIG. 11 except that the range accumulation for step 2 is also incremented by SIN A because the x integer part is incremented for each of the steps shown because TAN A is larger than in FIG. 10; because the integer of x increases for each of the three steps of this example, it means that a y axis is crossed. It is also noted that pixel 1,1 is addressed by $x_{(1)}$, $y_{(1)}$ and that pixel 2,2 is addressed by $x_{(2)}$, $y_{(2)}$. The addressing of these pixels along the 45° step diagonal boundary line between octant I and octant II results from the initial offset in y from 0 to −1. Without the initial offset, pixels 2,2; 3,3; 4,4; etc. would not be addressed and there would be an artifact or systematic irregularity appearing along the octant boundary.

Figure 9:
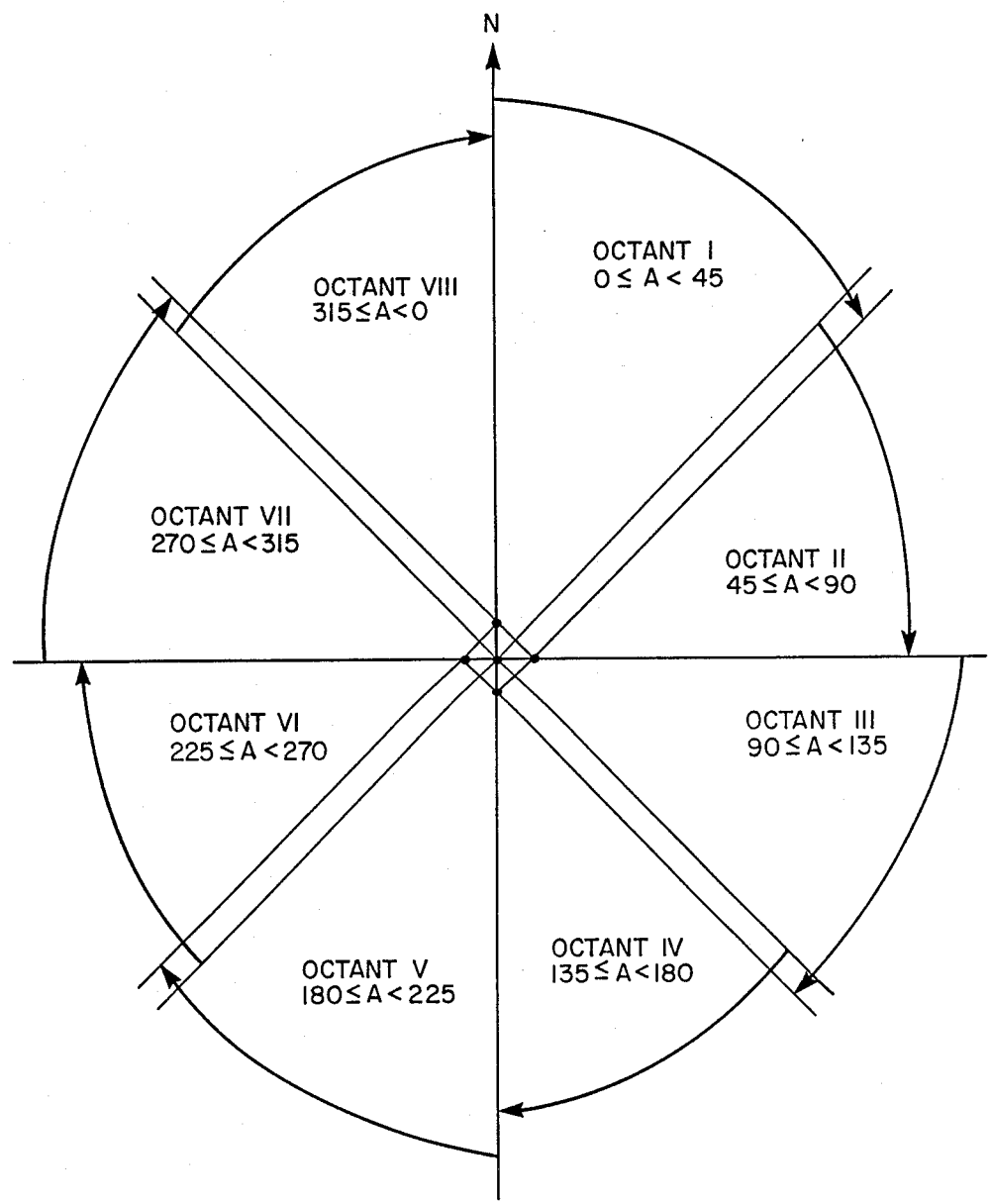
FIG. 9 shows azimuth octants I–VIII.

Referring to FIG. 14, there is shown a sweep angle A in octant II intersecting pixels near own-ship which, similar to FIGS. 10 and 12, is assumed to be 0,0 to simplify the explanation. In contrast to the examples in FIGS. 10 and 12 which were initially offset to 0,−1 because they were in octant I, incrementing in octant II is initiated from the position of own-ship without offset or, as viewed differently, with zero offset. The reason stems from the fact that the "working side" in octant I is the x axis while the "working side" in octant II is the y axis. Accordingly, if octant I were not initially offset, addresses would not be provided for the pixels along the stepped boundary between octant I and octant II. Accordingly, by symmetry, it can be seen that by initially offsetting in octants I, III, V and VII as shown in FIG. 9, undesirable artifacts along the stepped boundaries are avoided. Still referring to FIG. 14, x is incremented from own-ship by 1 and y is incremented by COT A, as shown, to move to $x_{(1)}$, $y_{(1)}$ on the vertical "working side" of the pixel here defining and addressing pixel 1,0 because the integers determine the address. More specifically, as indicated by FIG. 15, $x_{(1)}=1$, $y_{(1)}=$COT A, and the range $R_{(1)}$ to pixel 1,0 is SIN A +COS A. If a fill operation were possible, it would be downwardly in the column in octant II as opposed to across a row in octant I. However, because no fill operations are possible close to the origin of own-ship for the illustrated example where sequential sweeps may, for example, be $\frac{1}{3}°$ apart, x and y are incremented to $x_{(2)}$, $y_{(2)}$ by incrementing x by 1 to get $x_{(2)}=2$ and y by COT A to get $y_{(2)}=2$COT A). Because an x axis is intersected (y integer incremented) range $R_{(2)}$ for pixel 2,1 is generated by adding SIN A+COS A to $R_{(l)}$. Although the particular trigonometric function and whether the values are incremented or decremented is dependent on the octant in which the sweep line is located, those skilled in the art will recognize that the general principles described heretofore with respect to octants I and II are applicable to generation of x,y, and range addresses in the other octants.

Referring to FIG. 16, there are shown sweep lines angle A and A+1 in octant I in a region distant from own-ship where there are a plurality of illustratively labelled pixels therebetween shown for the purpose of describing fill operations. It is assumed that x has been incremented by TAN A as described earlier until its accumulation is 7.75 and that y has been unit incremented until its accumulation is 28. Accordingly, $x_{(28)}$, $y_{(28)}=7.75$, 28. Further, each time y was incremented by 1, TAN(A+1)−(TAN A) or ΔTAN was accumulated. Accordingly, at y=28, the ΔTAN accumulation equals the separation or spacing along the x axis in pixels between sweep line angle A and sweep line angle A+1. Accordingly, by subtracting the complement (here 0.25) of the fractional part (here 0.75) of $x_{(28)}$ from the sweep line separation defined as D, the integer part of the difference defines the number of whole pixels that can be addressed along the row from pixel 7,28 without addressing 10,28 which will be addressed by the next successive sweep line, angle A+1. It follows that from 7,28, two fill operations will be performed to address 8,28 and 9,28. By retaining the x,y values for $x_{(28)}$, $y_{(28)}$, the accumulations can be moved to correspond to $x_{(29)}$, $y_{(29)}$, as described earlier herein once the fill operations are completed. As described earlier, the mathematical operations and the trigonometric functions used to accumulate the spacing between successive sweep lines are dependent on the octant. In octants I, IV, V and VIII, fill operations are along the row. In octants II, III, VI and VII, fill operations are along the column. Here, fill operations are always in the clockwise direction.

Still referring to FIG. 16, if one or more fill operations are performed, the range address for each fill pixel is generated by incrementing the previous range address by SIN A in octants I, IV, V and VII and by COS A in octants II, III, VI and VII.

Figure 17:
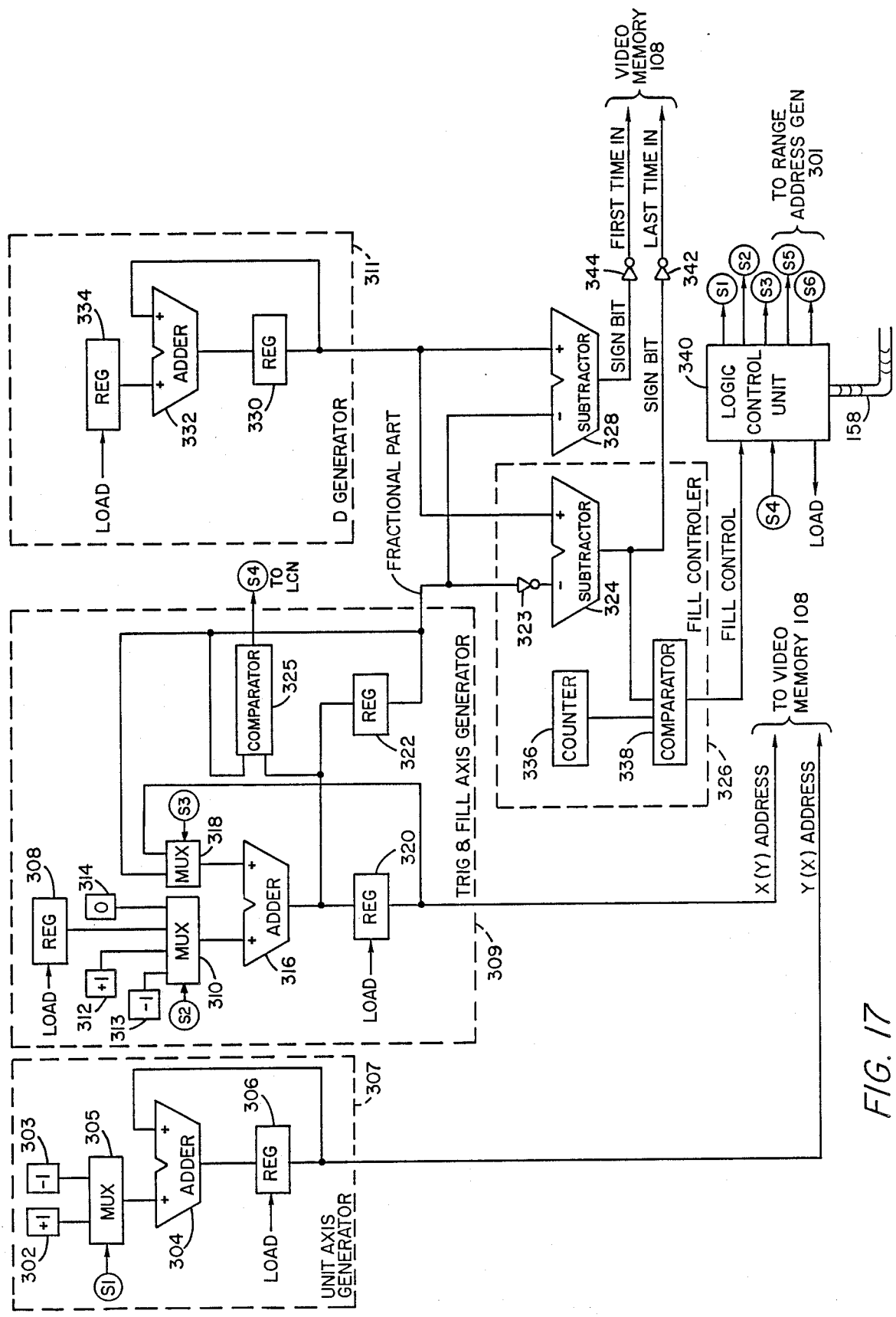
FIG. 17 is a schematic block diagram of X-Y coordinate address generator.
Figure 18:
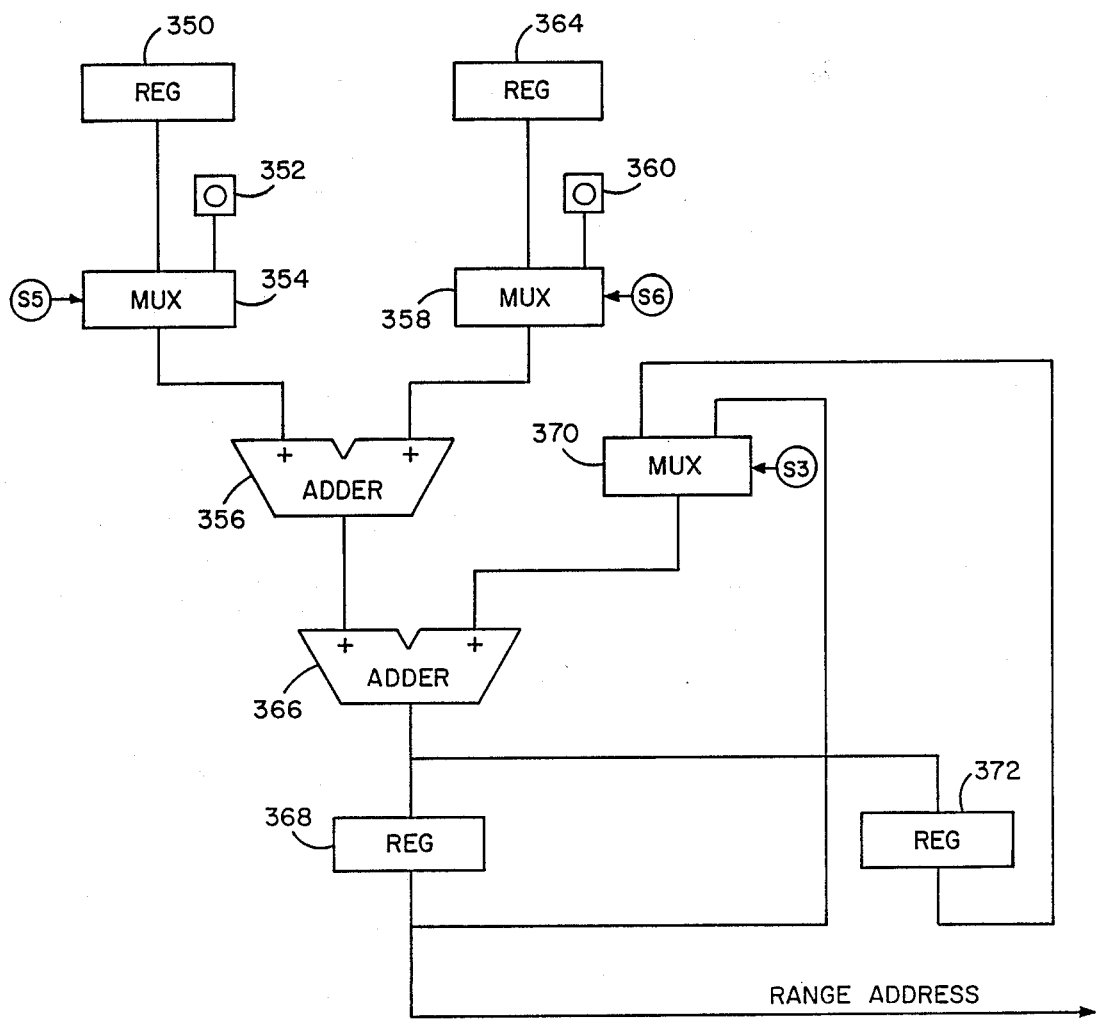
FIG. 18 is a schematic block diagram of range address generator.

Referring to FIGS. 17 and 18, there are respectively shown schematic block diagrams of X-Y coordinate address generator 300 and range address generator 301, both of scan converter 106. As described briefly earlier herein, scan converter 106, which may preferably be embodied in a VLSI circuit, receives information derived from the origin and sweep line angles of two successive sweeps and in turn generates x,y and range addresses to transfer video data from range memory 191 to bit image video memory 108, reformatting range video data to cartesian coordinates in the process. X-Y coordinate address generator 300 generates the x,y addresses in accordance with the general principles described with respect to FIGS. 8–16 simultaneous to range address generator 301 generating the corresponding range addresses.

Referring to FIG. 19, octant dependent parameters, constants, and control signals which specify the operation of scan converter 106 are identified. For each sweep line, system processor 104 provides scan converter 106 via system bus 158 data corresponding to the origin of the sweep line which is the x,y location of own ship relative to the coordinate system origin, and the trigonometric values to be stored in registers 308, 334, 350, and 364. These values are received by logic control unit LCU 340 and loaded into the appropriate registers. Then, depending on the octant of the sweep line and in response to the FILL CONTROL bit and control signal S4 to be described in detail later herein, LCU 340 provides timing and control signals S1, S2, S3, S5, and S6 to sequence scan converter 106 through cycles wherein sets of x, y and range addresses are generated to transfer the video data from range address memory 191 to video memory 108 which is addressed by rectangular or x,y addresses. The design of LCU 340 in accordance with the conditions given herein is well known to those skilled in the art.

Unit axis generator 307 generates the cartesian coordinate address (x or y) that is unit incremented to move from the "working side" of one pixel to the next as described with reference to FIGS. 10–15. Unit incrementer 302 and unit decrementer 303 are connected to multiplexer 305 which is controlled by control signal S1 from LCU 340. The output of multiplexer 305 is connected to one terminal of adder 304, while the other input is coupled from the output of register 306 which is connected to the output of adder 304. As depicted in FIG. 19, the integer contents of accumulating register 306 of unit axis generator 307 defines the y address for octants I, IV, V and VIII and defines the x address for octants II, III, VI and VII. Initially, LCU 340 loads register 306 with the appropriate x,y coordinate of own-ship relative to the fixed or stationary origin of the rectangular or x,y coordinate system by which x,y addresses are generated for video memory 108. The origin used herein will be described later with reference to FIG. 21. Those skilled in the art will recognize that cartesian coordinate address systems having other origins and orientations could be used but a transformation which would alter some of the parameters defined in FIG. 19 would be necessary. It is remembered that own-ship was assumed to be a position 0,0 only to simplify the explanation of FIGS. 10, 12, 14 and 16. As described with reference to FIGS. 11 and 13, there is an initial offset in octants I, III, V and VII. For example, in octant I where register 306 stores the y address, control signal S1 from LCU 340 selects unit decrementer 303 through multiplexer 305. Accordingly, during the initial offset cycle or step, the contents of register 306 is decremented by −1 through adder 304. In like manner, the x for octant III has an initial offset of −1, the y for octant V has an initial offset of +1, and the x for octant VII has an initial offset of +1.

Following the initial offset, if any, control signal S1 from LCU 340 selects either unit incrementer 302 or unit decrementer 303 in accordance with FIG. 19 as determined by the octant. For example, in octant I as described with reference to FIGS. 10-13, unit incrementer 302 is selected through multiplexer 305 and there is an incrementing add operation in adder 304 each time the y address coordinate is to move to the next higher integer or row. For fill operations, the contents of register 306 is not updated. For example, referring again to FIG. 16 which shows fill operations in octant I, when the fill operations result in the address moving from 7,28 to 8,28 and then to 9,28, the y value, which is the operative coordinate of unit axis incrementer 307 for this octant example, remains constant or unchanged.

Trigonometric and fill axis generator 309 generates the cartesian coordinate address (x or y) that is incremented or decremented by a trigonometric function or fraction in moving from one pixel "working side" to the next as described with reference to FIGS. 10-15. That is the same cartesian coordinate address (y or x) whose integer part is unit incremented or decremented to provide addresses for fill operations. Register 308 along with unit incrementer 312, unit decrementer 313 and zero incrementer 314 are multiplexed through multiplexer 310 as selected by control signal S2 from LCU 340. The output of multiplexer 310 is coupled to one input of adder 316 while the other input is from multiplexer 318 as selected by control signal S3 from LCU 340. The inputs of multiplexer 318 are the output of register 320 and register 322, both of which are coupled from the output of adder 316. Register 320 stores the integer output of adder 316 which defines the coordinate address (y or x) of the fractional or trigonometric accumulation. For example, as shown in FIG. 19 and with reference to FIGS. 10-13, register 320 stores the x address for octant I. In contrast, register 320 stores the y address in octant II as described with reference to FIGS. 14 and 15. Register 322 stores both the integer and fractional part of the output of adder 316. For reasons which will become apparent later herein, register 322 is updated only when moving by a fractional or trigonometric function; stated differently, the contents of register 322 remain unchanged during fill operations. Comparator 325 compares the output of adder 316 and the output of register 322 and provides control signal S4 to LCU 340 as will be described in detail later herein.

Initially, logic control unit 340 loads the coordinate for own-ship into register 320 which, for the example described herein with reference to scan converter 106, is zero because, for simplicity of explanation, own-ship was assumed to be the origin of the coordinate system. LCU 340 also initially loads a trigonometric octant dependent function as defined in FIG. 19 into register 308. For example, if the sweep line A is in octant I, LCU 340 loads the tangent of angle A, TAN A, into register 308. Similarly, if angle A were in octant II, LCU 340 would load the cotangent of angle A, COT A, into register 308.

In operation, if moving to the "working side" of a new row or column as described with reference to FIGS. 10-15, control signal S2 from LCU 340 selects the trigonometric function stored in register 308 through multiplexer 310 and control signal S3 from LCU 340 selects the output of register 322 through multiplexer 318. The sum is then added to the accumulation in register 320 updating the coordinate address. It is noted that even if intervening fill operations had been executed according to the description provided later herein, the contents of register 322 remained unchanged during the fill operations so it "remembers" the trigonometric accumulation along the sweep line angle A. In other words, referring again to the example of FIG. 16 in octant I, the x address during the fill operations can be thought of as moving along the x axis to 8 and 9, and then returning to $x_{(28)} = 7.75$ before a TAN A incrementation to $x_{(29)}$.

If a fill operation is to be executed, control signal S2 from LCU 340 selects, as a function of the octant, either unit incrementer 312 or unit decrementer 313 through multiplexer 310 and control signal S3 from LCU 340 selects the output of register 320 which is an integer defining the current coordinate address through multiplexer 318. Accordingly, as defined by FIG. 19, the coordinate address is incremented or decremented to move along either the row or column depending on the octant to provide an address for a fill operation. Control signal S2 from LCU 340 selects zero incrementer 314 through multiplexer 310 during an initial offset when the trigonometrically incremented coordinate remains unchanged.

Still referring to FIG. 17, D generator 311 provides an accumulated output corresponding to the distance D in pixels between sweep lines angle A and angle A+1. The distance D is accumulated in register 330 whose output is connected to one input of adder 332 while the other input is from register 334. The input for register 330 is the output of adder 332. In operation, logic control unit 340 initially loads a trigonometric difference into register 334. For example, referring to FIG. 19, in octant I, the difference between TAN(A+1) and TAN A would be loaded into register 334. An add operation is then executed to accumulate register 330 each time the coordinate address moves to a new row or column as dependent on the octant. Accordingly, because the spacing between A and A+1 is accumulated for each new row or column, the contents of register 330 corresponds to the separation along the current axis in pixels.

Still referring to FIG. 17, fill controller 326 generates a FILL CONTROL bit which is used by LCU 340 to determine if the next step is along sweep line angle A or a fill operation along the present row or column as defined by the octant. The fractional part of register 322 is connected to inverter 323 to provide the complement of the fractional part of the trigonometrically incremented coordinate to the negative input terminal of subtractor 324. D, which is the spacing in pixels between angle A and A+1, is coupled to the positive terminal of subtractor 324. The difference from subtractor 324 is coupled to comparator 338 and compared with the output of counter 336. The output of comparator 338 provides the FILL CONTROL bit to LCU 340. If fill operations are to be executed, the FILL CONTROL bit toggles to one state and remains there until the appropriate number of fill operations have been executed and then it returns to its initial state. Using FIG. 16 as an example to describe the operation of fill controller 326, first assume that register 322 here contains $x_{(28)} = 7.75$ for this example in octant I. Accordingly, the fractional part, or 0.75, is coupled to inverter 323 which provides the complement, or 0.25, to the negative input terminal of subtractor 324. The positive terminal of subtractor 324 corresponds to the spacing between angle A and angle A+1 along y=28 which, for this example, is approximately 2.45. By subtracting the x fractional part complement which corresponds to the distance from $x_{(28)}$ to $x=8$, the difference from subtractor 324 is approximately 2.2 which is the distance from $x=8$ to the intersection of angle $A+1$ and $y=28$. The integer value, here 2, of this difference defines the number of whole pixels that can be addressed by fill operations without addressing the pixel along that row that will be addressed by sweep angle $A+1$. The integer output of subtractor 324, here defined as 2 for this example, is coupled to comparator 338 and compared with the output of counter 336 which is reset on each new increment to a row or column depending on the octant. For the first step or cycle, the negative comparison causes the output of comparator 338 to toggle to the opposite state resulting in the FILL CONTROL bit specifying that a fill operation is to be executed. After this first step, when the output of counter 336 has been incremented to 1, there is still a negative comparison between it and the 2 coupled from subtractor 324 so the FILL CONTROL bit remains in a state indicating that another fill operation is to be executed during the second step or cycle. After two fill operations have been executed, the output of counter 336 is 2 which is equal to the integer output of subtractor 324 and this positive comparison specifies that no more fill operations are possible on this particular row or column. Accordingly, LCU 340 next initiates an x,y increment along the sweep line angle A as described earlier herein.

In addition to being coupled to subtractor 324, the output of D register 330, which corresponds to the spacing between consecutive sweep lines angles A and $A+1$, is coupled to the positive terminal of subtractor 328. The fractional part of register 322 is coupled to the negative terminal of subtractor 328. As shown, the sign bit of subtractor 328 is coupled through inverter 344 to provide the FIRST TIME IN signal while the sign bit of subtractor 324 is coupled through inverter 342 to provide the LAST TIME IN signal. These two control signals, which will be described in detail later herein, are transferred to video memory 108.

Again referring to FIG. 18, a schematic block diagram of range address generator 301 is shown. As described earlier herein, range address generator 301 generates a range address for each x,y address generated by generator 300. The range address is used to read video data from one of the range cells of range memory 191 or alternate video source such as range ring memory 103. Register 350 and zero incrementer 352 are connected to multiplexer 354 which is controlled by control signal S5 from LCU 340 (FIG. 17). Register 364 and zero incrementer 360 are connected to multiplexer 358 which is controlled by control signal S6 from LCU 340. The respective outputs of multiplexers 354 and 358 are connected to adder 356 whose output is coupled to one of the terminals of adder 366. The other input terminal of adder 366 is coupled from multiplexer 370 which is controlled by control signal S3 from LCU 340. One of the inputs of multiplexer 370 is the output of register 368. The other input is the output of register 372. Both registers 368 and 372 are coupled from the output of adder 366. The output of register 368 is the RANGE ADDRESS as indicated.

In operation, registers 350 and 364 are initially loaded with COS A and SIN A as indicated in FIG. 19. With reference to FIGS. 10-15 as examples, register 350 is selected by control signal S5 and register 372 is selected by control signal S3 anytime the x,y accumulation moves along sweep line angle A; in other words, they are selected unless there is a fill operation. The effect of this step for the examples of FIGS. 10 and 12 in octant I is to add COS A to the accumulated range address to compute the new range address which is used to update register 368. If the integer of the trigonometrically incrementing coordinate (x or y) increments, which is equivalent to saying it crosses a pixel axis, control signal S6 selects register 364 which is also added into the accumulation. The effect of this step for the examples of FIGS. 10 and 12 in octant I is to add SIN A in addition to COS A to the range address anytime sweep line angle A crosses a y axis. For example, in FIG. 10, see the range increments between $R_{(1)}$ and $R_{(2)}$. In the event that the specified axis is not crossed, control signal S6 selects zero incrementer 360 so that the range is only incremented by the contents of register 350. For example, in FIG. 10, see the line between $R_{(0)}$ and $R_{(1)}$. Control signal S6 is generated by LCU 340 in response to control signal S4 (FIG. 17). More specifically, if the new fractional or trigonometrically incrementing coordinate integer at the output of adder 316 is larger than the previously generated integer stored in register 322, the output of comparator 325, which is control signal S4, indicates to LCU 340 that an axis of the opposite kind has been crossed thereby specifying that the range be incremented by both SIN A and COS A.

Still referring to FIG. 18 and also to FIG. 16 as an example, zero incrementer 352 is selected by control signal S5, register 364 is selected by control signal S6, and register 368 is selected by control signal S3 anytime a fill operation is executed. The effect of this step for the example in FIG. 16 in octant I is to add SIN A to the accumulated range address to compute the new range address. During a fill operation, register 372 performs a function similar to register 322 of FIG. 17. More specifically, rather than being updated during a fill operation, register 372 "remembers" the range corresponding to the last fractional or trigonometrically incremented x,y coordinate so that after the fill operation(s) has been completed, the range address for the next fractional or trigonometrically incremented x,y coordinate can be computed by incrementing the range corresponding to the last trigonometrically incremented x,y coordinate. For example, referring to FIG. 16, which depicts fill operations in octant I, the range for $x_{(28)},y_{(28)}$ which addresses pixel 7,28 is $R_{(28)}$. The range for pixel 8,28, which is a fill operation, is $R_{(28F1)}$ and is computed by adding SIN A to the accumulation of $R_{(28)}$ to update register 368 while register 372 continues to store $R_{(28)}$. Next, the range for pixel 9,28, which is a second fill operation, is $R_{(28F2)}$ and is computed by adding SIN A to the accumulation of $R_{(28F1)}$ as shown to update register 368 while register 372 continues to store $R_{(28)}$. Then, during the trigonometric incrementation from $x_{(28)},y_{(28)}$ to $x_{(29)}, y_{(29)}$, the range $R_{(28)}$ which is stored in register 372 is incremented by SIN A+COS A to provide $R_{(29)}$; the reason that SIN A is included in the incrementation for this example is that the x integer changed from 7 to 8 while moving from $x_{(28)}$ to $x_{(29)}$. The RANGE ADDRESS, which is coupled to range memory 191, may preferably be the integer part of register 368.

Figure 20:
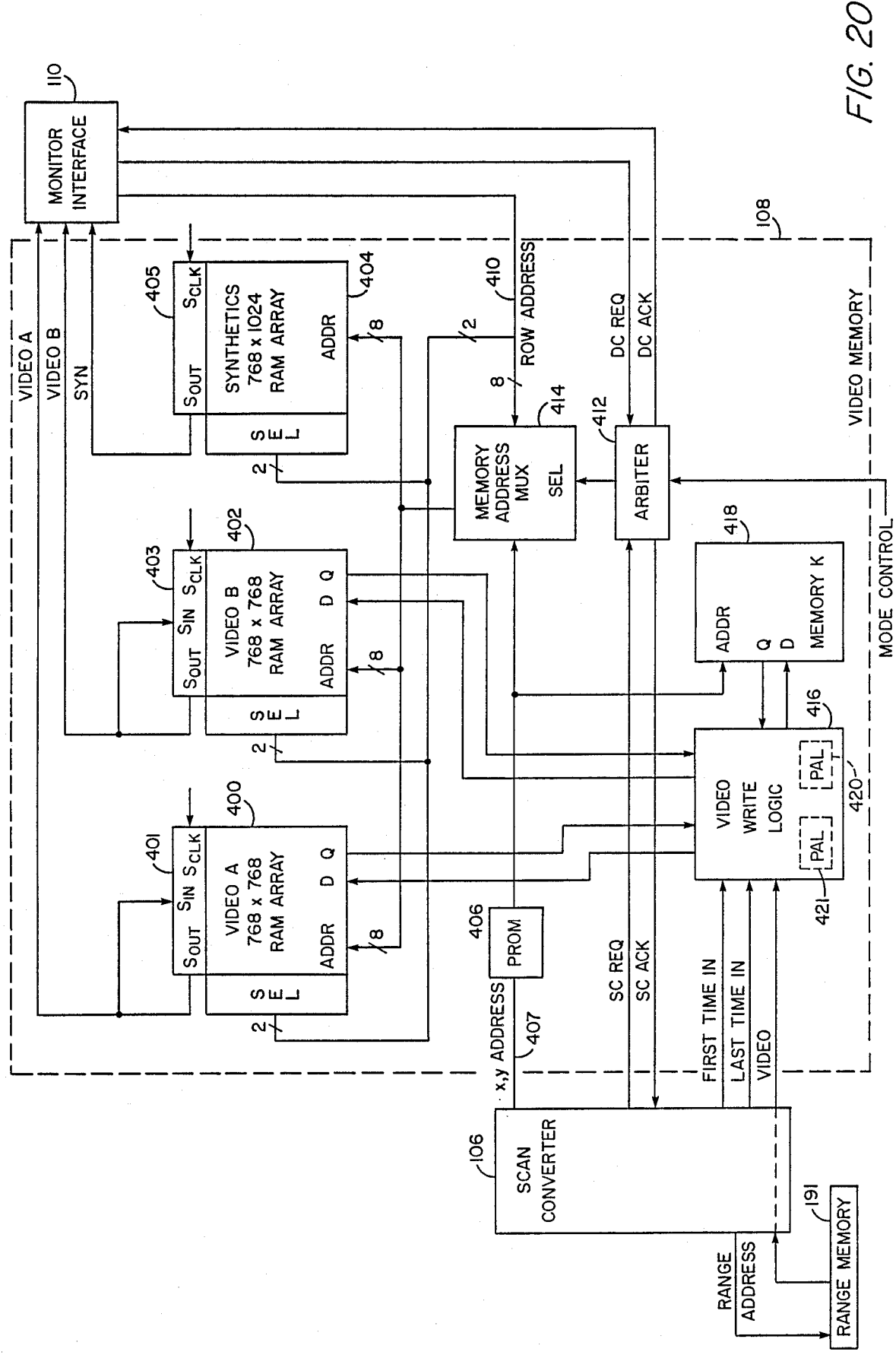
FIG. 20 is a schematic block diagram of video memory.

Referring to FIG. 20, there is shown a schematic block diagram of video memory 108 with interconnections to scan converter 106 and monitor interface 110. As briefly described earlier herein, video memory 108 here includes three planes of dynamic RAM although it is understood that a different number of planes could be used. Two of these planes, identified as video A RAM array or video A memory 400, and video B RAM array or video B memory 402, each consist of a 768×768×1 array and they are used to store radar video data. A third plane, identified as synthetics RAM array or synthetics memory 404, stores synthetics that remain fixed with respect to the display screen 115 such as bearing scale, data read outs, etc. The raster scan field of monitor 112 has 1024 pixels in each row and 768 pixels in each column. There is a one-to-one correspondene between memory address locations in synthetic memory 404 and pixels or physical locations of the display image on screen 115. Video A memory 400 and video B memory 402 overlay the left 768 pixel columns of display screen 115.

Although other types and organizations of memories could be used, each of memories 400, 402, and 404 here includes an array of Texas Instrument type TMS4161 256×256-bit multiport dynamic memories (not shown) each featuring a 256-bit shift register output port which allows one 256-bit row of data to be transferred to the shift register in one memory cycle. Accordingly, in video A memory 400 and video B memory 402, nine 256×256-bit memories are organized into three rows and three columns to provide the 768×768-bit memory field. Synthetic memory 404 has an additional column of three 256×256-bit memories. Shift registers 401, 403, and 405, respectively, include storage for 768, 768, and 1024 bits and each functionally corresponds to the combination of the shift register output ports of the 256×256-bit memories that are presently being selected for reading out a row or line for raster scan. While a few additional memory cycles may be used to refresh and ensure the integrity of the data in memories 400, 402, and 404, the above described memory organization enables the data for an entire 768 or 1024 pixel display line to be read out of respective memories 400, 402 and 404 into respective shift registers 401, 403 and 405 in only one memory cycle. Accordingly, as will become apparent later on, scan converter 106 has access to memories 400, 402 and 404 most of the time thereby avoiding memory contentions between scan converter 106 and monitor interface 110.

Memory cycles are run at the request of either scan converter 106 or monitor interface 110. The scan cycle request, SC REQ, and display cycle request, DC REQ, are respectively transmitted from scan converter 106 and monitor interface 110 to arbiter 412 of video memory 108. DC REQ, which indicates that a line of video data is required for output to monitor 112, is the higher priority of the service requests. Therefore, when arbiter 412 receives a DC REQ, it waits until the cycle in progress, if any, is completed and then provides a control signal to memory address multiplexer 414 to couple the ROW ADDRESS from monitor interface 110 to memories 400, 402, and 404. Here, the eight most significant bits of ROW ADDRESS are routed through memory address multiplexer 414 to identify the row and two least significant bits are used to select the appropriate 256×256 memories of the array that store the data for the desired row. This operation and any memory refresh cycles occur during the horizontal retrace time of the CRT of monitor 112. Once the data row has been read out of memories 400, 402, and 404 into respective shift registers 401, 403, and 405, arbiter 412 issues a display cycle acknowledge, DC ACK, to monitor interface 110 indicating that it may commence shifting of shift registers 401, 403, and 405 as necessary to satisfy the requirements of monitor 112.

The other type of memory request that is honored by arbiter 412 is the SC REQ from scan converter 106 indicating it has generated an address and that data is available to be written in video memory 108. The MODE CONTROL signal, which may come from scan converter 106 but which is derived from system processor 104, identifies whether the update data is video which is destined for video memories A and B or is synthetic data destined for synthetic memory 404. Arbiter 412 routes the addresses through memory address multiplexer 414 accordingly. The data input to synthetic memory 404 is not shown. If there is no DC REQ pending when SC REQ is received by arbiter 412, a read-modify-write cycle is performed at the address furnished by scan converter 106. If the cycle as specified by MODE CONTROL signal is an update to video A memory 400 and video B memory 402, the data modification is defined by video write logic 416 which will be described in detail later herein. First, however, the addressing scheme for memories 400, 402, and 404 will be described.

Figures 21, 22:
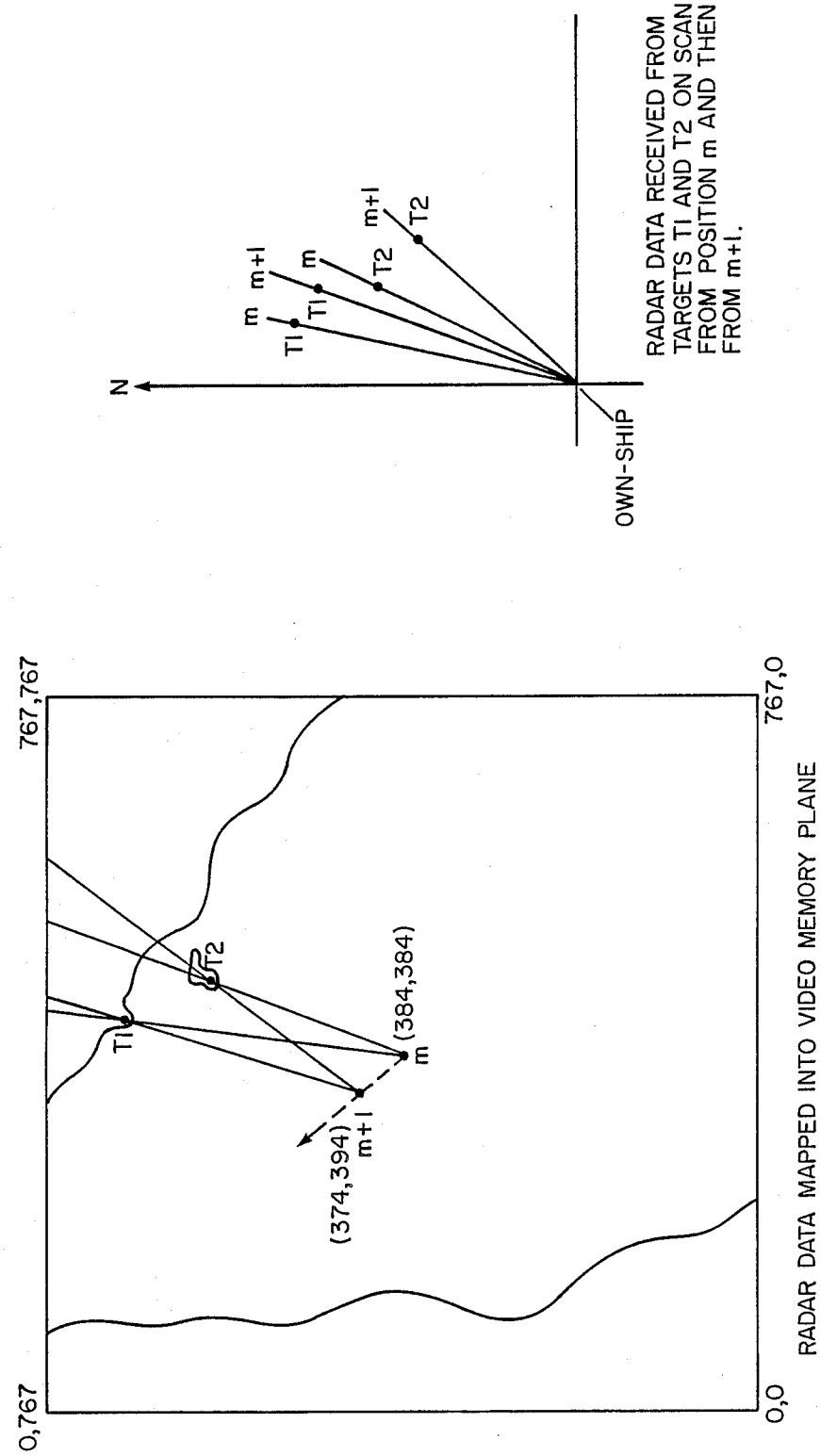
FIG. 21 shows the memory field with targets T1 and T2.
FIG. 22 shows the range and azimuth of targets T1 and T2 relative to own-ship.

X-Y coordinate address generator 300 of scan converter 106 provides x,y addresses to video memory 108 on lines 407. As described earlier herein, a relative coordinate system having own ship at 0,0 was used to simplify the explanation of scan converter 106 with references to FIGS. 10–18. In fact, the coordinate system used to address memories 400, 402, and 404 has its origin corresponding to one of the memory plane corners which here, as shown in FIG. 21, is the lower left-hand corner. More specifically, the address locations for video A memory 400 and video B memory 402 run from 0,767 to 767,767 along the top row of the memory field and 0,0 to 767,0 along the bottom row. Synthetic memory 404 is similar except that the rows extend to address location 1023. Accordingly, for each scan conversion of each azimuth sweep, system processor 104 provides scan converter 106 with the x,y position of own-ship relative to the coordinate system of video memory 108. For example, when own-ship is at position m as illustratively shown and identified in FIG. 21, system processor 104 provides scan converter 106 with initial values of x=384 and y=384 for scan conversion along any azimuth angle, and then scan converter 106 increments and/or decrements as described earlier herein from 384,384 to provide x,y addresses for that sweep angle. Also, for example, system processor 104 provides initial values of x=374 and y=394 when own-ship is at position m+1 as shown and identified in FIG. 21. Actually, system processor 104 initilly provides x,y coordinates of own-ship relative to an arbitrary ture of fixed reference and, following movement of own-ship out of the field of the memory plane, rolls over the coordinates of own-ship to be back in the field. Other coordinate origins such as, for example, at the top of the memory plane could be used, but they would reqiure corresponding changes to the information of FIG. 19. Those skilled in the art will recognize that the trigonometric functions and operations for other selected x,y coordinate origins or orientations could readily be determined from the information given in FIG. 19 by using conventional coordinate transformation formulas. It is also noted that depending on the initial trigonometric functions and control signals supplied to scan converter 106 by system processor 104, scan converter 106 will generate x, y, and r addresses for any coordinate origin.

Referring to FIG. 22, there is an illustrative diagram depicting azimuth and range for targets T1 and T2 from own-ship positions m and m+1 of FIG. 21 as actually received at own-ship. It is noted that if own-ship were the coordinate origin, then scan conversions from positions m and m+1 would store the data for each stationary target at different memory address locations for different scans as own-ship moves. Instead, system processor 104 continuously updates the coordinates of own-ship relative to the memory field as shown in FIG. 21. More specifically, the origin of radar sweep data follows own-ship's motion so that returns from any stationary radar target are stored in the memory array at the same address location on successive scans of antenna 62. In other words, because system processor 104 updates the coordinates of own-ship which is the initial starting point for each scan conversion, video data for stationary targets such as T1 and T2, as shown in FIG. 21, are stored in the same memory locations. This means that the radar map in video A and B memories 400 and 402 is true motion stabilized. As will be described in detail later herein, one of the advantages of true motion stabilization of video A and B memories 400 and 402 is that it readily enables scan to scan integration of stationary or slow moving targets while the sea clutter which does not correlate will not integrate.

Figure 23:
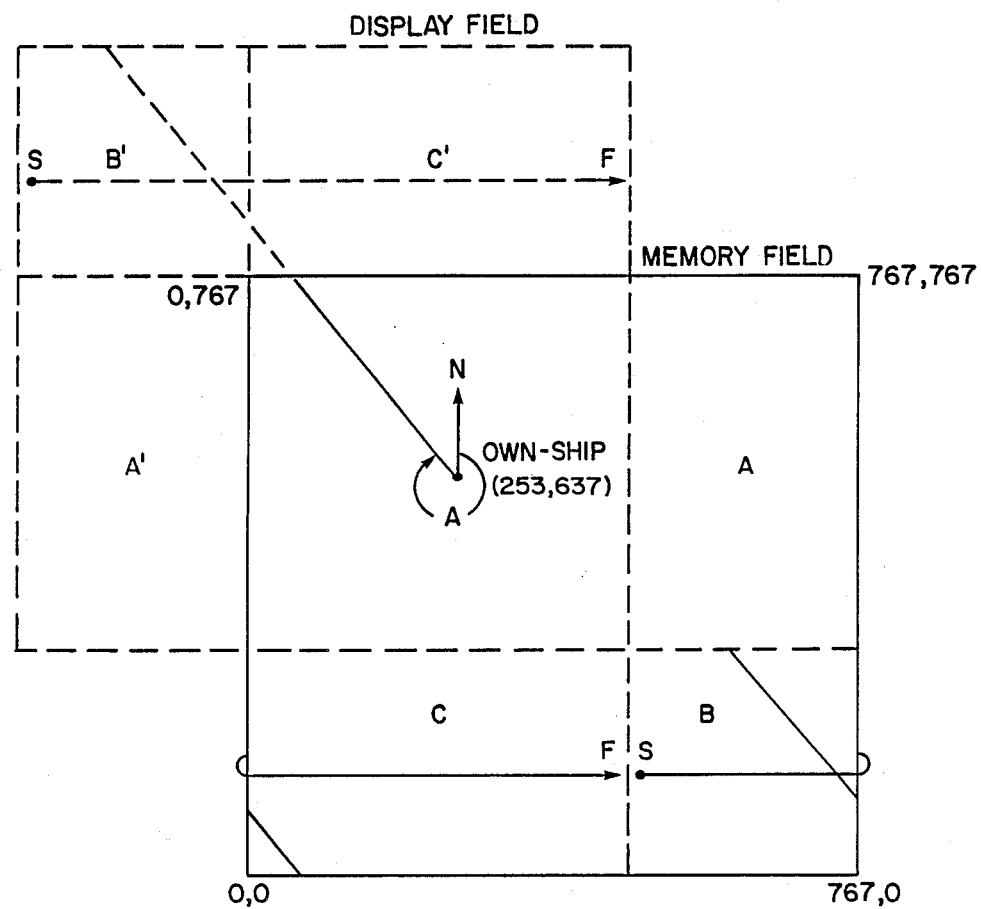
FIG. 23 shows the roll-over of the memory field relative to the display field.

Display 100 has the capability of displaying the video on screen 115 in either true or relative motion even though the video data in memories 400 and 402 is always true motion stabilized. If the operator selects relative motion which means that own-ship is stationary on the video display, the video data is "rolled-over" in video A and B memories 400 and 402 by rolling over the addresses. Referring to FIG. 23, an illustration depicting the roll-over scheme is shown. With the address roll-over, radar data obtained from a single sweep may not appear in video A memory 400 and video B memory 402 as a single continuous line, but rather may be visualized as a plurality of line segments. This results from rolling over the x and/or y memory addresses generated by X-Y coordinate address generator 300 of scan converter 106 any time the edge of the memory plane is reached as data along a sweep line is stored in video memory 108 until the point is reached that sufficient data has been stored to supply the requirements of the present relative motion display situation. In the example of FIG. 23, own-ship is positioned in the memory field x=253 and y=637 such that these values are the initial values loaded into register 320 and register 306, respectively, and the video sweep data to be scan converted for storage into video A memory 400 and video B memory 402 is along sweep angle A in octant VIII as shown. X-Y coordinate address generator 300 would begin to increment, as described earlier herein, generating x,y addresses along sweep line A including addresses resulting from fill operations. These x,y addresses are coupled on lines 407 to PROM 406 as shown in FIG. 20. As long as both the x and y addresses are within the memory field of 0 to 767, PROM 406 outputs an identical address to that received. If, however, either the x or y address is outside the memory field, PROM 406 provides incrementing or decrementing roll-over addresses. This is best illustrated by referring to FIG. 23 which shows that when the y address increments along sweep angle A to the top of the memory field at 767, the y address output of PROM 406 next rolls over to 0, 1, 2, etc. such that the next segment of the noncontiguous video storage is in memory field region identified as C. Then, continuing on, when the x address provided to PROM 406 decrements to 0, the x output of PROM 406 rolls over to 767 and continues to decrement to 766, 765, etc. As stated, the video data continues to be stored along this sweep line with fill operations until there is enough data to supply the requirements of the relative motion display situation. Note that the final segment of sweep angle A is stored in region B of the memory field.

Because the video data in video A memory 400 and video B memory 402 is true motion stabilized as earlier described, it is necessary to be able to start data transfer from video memory 108 to monitor interface 110 from virtually any memory column and row address in order to provide relative motion display. As described earlier, the ROW ADDRESS for reading data out of video memory 108 is provided by monitor interface 110 on lines 410. Because memories 400 and 402 have independently addressable rows, the appropriate row or line of data can be read directly into shift registers 401 and 403, respectively. For example, in a relative motion display where own-ship is typically displayed at the center of the video display portion of the screen 115, the first line to be read from memory may typically be the line that is half of the display field above own-ship. In FIG. 23, the first or top line is illustrated by the dotted start-to-finish (s→f) line running through region B' and C' of the display field. If the desired row address, as calculated by adding half of the display field to the y address of own-ship, is out of or higher than the memory field, the row address to be read is rolled-over similar to the write addresses so that ROW ADDRESS as provided by monitor interface 110 is within the memory field. For the example of FIG. 23, the result would be that the memory field row along the solid start-to-finish (s→f) line beginning in memory region C and moving to memory region B would be read from memories 400 and 402 into shift registers 401 and 403, respectively. Except in the rare circumstance when own-ship has an x address which would place it at the half-way point in the display field, shift registers 401 and 403 are then end-around shifted until the column bit required to start the display sweep is located at the output port of shift registers 401 and 403. As shown in FIG. 23, the transfer of video data from video memory 108 to monitor interface 110 would then commence with region B and then move to region C. Monitor interface 110 controls this preshifting by providing the appropriate number of shift clock pulses to the shift clock inputs, $S_{CLK}$, of shift register 401 and 403. Accordingly, the video data is read out of $S_{out}$ and back in $S_{in}$. The row address roll-over and preshifting of video data are illustrated in FIG. 23 by comparing the solid start-to-finish line in region B and C depicting the shifting of video data from video memory 108 to monitor interface 110 which provides the dotted start-to-finish image of region B' and C' of the display field. The storage locations of synthetics memory 404 have a fixed correspondence to screen 115, and therefore monitor interface 110 provides synthetics memory 404 with a different row address than video A and B memories 400 and 402. Also, the data in shift register 405 is not preshifted before transfer to monitor interface 110.

Because it may be desirable that the frequency of the pixel clock of the raster scan of monitor 112 exceed the maximum shift frequency of the shift register output ports of the individual 256×256 memories, it may be preferable that the 256×256-bit memories be multiplexed. This, of course, requires adjacent video data bits in a row being stored in different 256×256 memories of the array. Partitioning of data into various memories of an array to increase the output rate is well known to those skilled in the art.

Still referring to FIG. 20, video write logic 416 controls the read-modify-write process of the video data into video A memory 400 and video B memory 402. While it may be preferable that video A memory 400 and video B memory 402 also store variable range marker and range ring data such as from range ring memory 103, the explanation of the read-modify-write process is simplified herein by only describing the storage of video data. Video write logic 416 receives the addressed bit from the Q output of memory K 418, the addressed bits from the Q outputs of video A and video B memories 400 and 402, respectively, and the FIRST TIME IN (FTI) bit, LAST TIME IN (LTI) bit and the VIDEO from scan converter 106. Memory K 418 is a random access memory having a memory plane that is smaller than the capacity of either video A memory 400 or video B memory 402 because it only stores video data corresponding to the short range pixels in proximity to own-ship where there may be a plurality of sweep lines through each pixel. More specifically, the function of memory K 418 is to prevent overwriting of data for a pixel by the generation of the pixel address on a subsequent sweep of the same scan. For example, referring to FIG. 24, there is shown an illustrative pixel x,y having successive sweeps A+1 through A+6 passing through its working side. Accordingly, the memory location corresponding to pixel x,y will be addressed for each of these sweeps. As shown, sweeps for angles A+1 through A+4 intersect the cross-section of target T and therefore may provide detected video returns or 1's for pixel x,y. Memory K 418 is interposed before video A and B memories 400 and 402 to provide resultant or composite video data in response to all of the video data provided for a pixel corresponding memory address during a scan. Then, video A and video B memories 400 and 402 are updated using the resultant video data after the last sweep for the scan passing through the working side of a pixel has been processed. Here, the resultant video data is the OR of all the individual video data bits so, if video returns have been received from any of the sweep angles, the pixel is updated as if there was only one sweep through the pixel and it detected a video return. In other words, it is a process of waiting until all the returns are in for a particular pixel, generating resultant or composite data for that pixel, and then updating that pixel for the scan. This prevents overwriting in video A and video B memories 400 and 402 by subsequent sweeps of the same scan such as illustrated by sweeps of angles A+5 and A+6 of FIG. 24. As will be described later herein, each pixel has at least two corresponding bits (one in memory A and one in memory B) providing scan to scan correlation based on the history of each pixel. It is noted that if there were no scan to scan integration in video memory 108, then, in an alternate embodiment, prevention of overwriting video data during a scan could be provided without the use of an intermediate buffer memory such as memory K 418 by ORing the data stored in video memory 108 for a pixel with the new video data for that pixel unless it is the first time (FTI=1) that pixel is addressed during that scan in which case the new video data would be written into video memory 108 for that pixel.

Figure 24:
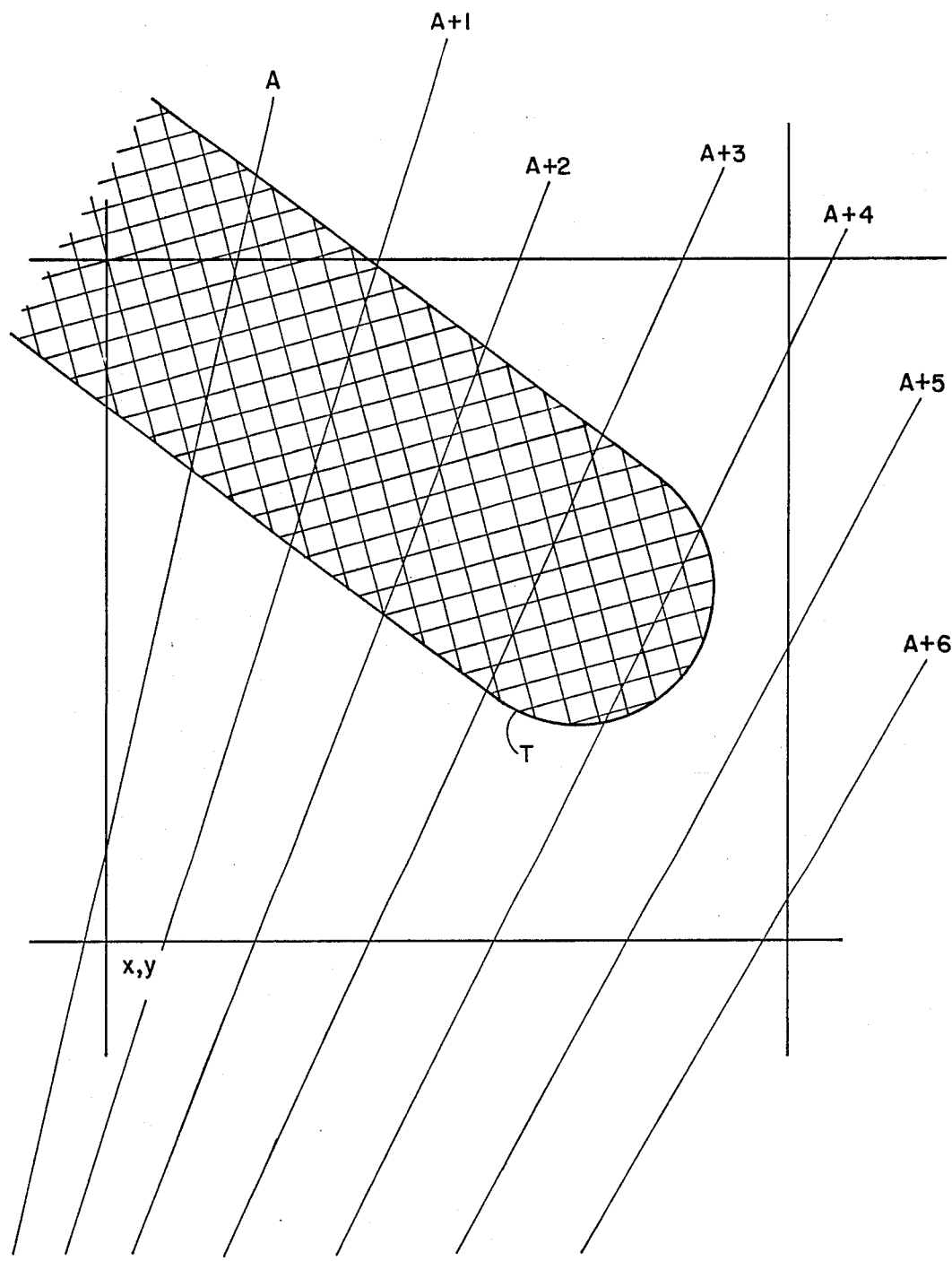
FIG. 24 shows a plurality of sweeps through a single pixel.

Each x,y address at the output of PROM 406, as initiated by X-Y coordinate address generator 300, is coupled to memory K 418 to read the addressed bit from the Q output for transfer to programmable array logic PAL 420 of video write logic 416. Referring to FIG. 25, there is shown a logic table depicting the operation of PAL 420. $MK_m$ is the addressed bit from memory K 418 for moment m. The other two inputs to PAL 420 are the FIRST TIME IN (FTI) bit and VIDEO from scan converter 106. As shown in FIG. 25, these three inputs determine $MK_{m+1}$ which is the moment-plus-one update written back through the D input of memory K 418 for the currently addressed bit. In review, VIDEO is the video data stored in range memory 191 as addressed by the corresponding RANGE ADDRESS from range address generator 301. A "1" indicates that a return has been detected. FTI is 1 if it is the first time that the present pixel corresponding address has been generated during the scan. Referring to FIG. 24, FTI would only be 1 for pixel x,y when it was addressed on sweep angle A+1. Referring back to FIG. 17, FIRST TIME IN is derived from the sign bit of the difference between the sweep line spacing D and the fractional part of the trigonometrically incrementing coordinate. For example, if the fractional part is less than D, it means that the previous sweep was in a previous pixel; accordingly, the working side of the present pixel is being intersected for the first time of the scan.

Referring again to FIG. 25, the value of VIDEO is written into memory K 418 if it is the first time during the present scan that the pixel corresponding address location has been generated (FTI=1). Accordingly, the read out value for $MK_m$, which would be from the previous pixel, is overwritten. Viewed differently, $MK_m$ may be considered as being reset to 0 for the first sweep of the present scan through a pixel, and then $MK_{m+1}$ takes on the value of the new VIDEO. If it is not the first sweep of the scan through a pixel (FTI=0), then $MK_{m+1}$ is written back into memory K 418 as a 1 if either the present VIDEO or $MK_m$ is a 1. The $MK_{m+1}$ written back in then becomes $MK_m$ for the next sweep through that pixel. Accordingly, if VIDEO is 1 for any sweep through a pixel, the final $MK_{m+1}$ will be 1. Only part of the address field of video A and B memories is used to address memory K 418 because it is smaller. Accordingly, to prevent storage locations in memory K 418 from being incorrectly addressed by addresses outside its field, memory K 418 is inhibited when FTI and LTI are simultaneously 1. Those skilled in the art will recognize that a resultant or final $MK_{m+1}$ could be provided using methods other than ORing all the video data for each pixel corresponding address.

Referring to FIG. 26, there is shown a logic table depicting the operation of programmable array logic PAL 421 which controls the updating of video A and video B memories 400 and 402, respectively. The inputs to PAL 421 are $MK_{m+1}$ from PAL 420, the addressed bit from the Q output of video A memory ($MA_m$), the addressed bit from the Q output of video B memory ($MB_m$), and the LAST TIME IN (LTI) bit from scan converter 106. In review, LTI is 1 if it is the last time that the present pixel corresponding address will be generated during the present scan. Referring to FIG. 24, LTI would only be 1 for pixel x,y when it was addressed on sweep angle A+6; LTI would also be a 1 for sweep angle A for the left adjacent pixel. Referring back to FIG. 17, LAST TIME IN is derived from the sign bit of the difference between the sweep line spacing D and the complement of the fractional part of the trigonometrically incrementing coordinate. For example, if D is larger than the complement of the fractional part, it means that the next sweep will be in a different pixel; accordingly, the working side of the present pixel is being intersected for the last time during the present scan.

Referring again to FIG. 26, it is first noted that $MA_m$ and $MB_m$ from video A and B memories 400 and 402 remain unchanged when LTI=0. More specifically, $MA_m$ and $MB_m$ are only modified if LTI=1 which means that the video for all of the sweeps through the present pixel have been processed by PAL 420. Then, $MA_m$ and $MB_m$ are modified to $MA_{m+1}$ and $MB_{m+1}$ in accordance with $MK_{m+1}$. There is a one-to-one correspondence between the bits in the memory planes of video A memory 400 and video B memory 402. The combination of two corresponding bits which function as a two-bit counter define the intensity of the pixel illumination. There is no illmination for 00, dim illumination for 01, and bright rllumination for a 10 or 11. Still referring to FIG. 26, if $MK_{m+1}$ is a 1, the count of $MA_m$ and $MB_m$ is increased by 1 count until 11 is reached and if $MK_{m+1}$ is 0, the count is decreased by 1 until the count 00 is reached. For example, if $MK_{m+1}=1$ and LTI=1, then the $MA_m$ and $MB_m$ count would go from 00→01, 01→10, 10→11, or 11 would remain 11. If $MK_{m+1}=0$ and LTI=1, then the $MA_m$ and $MB_m$ count would go from 11→10, 10→01, 01→00, or 00 would remain 00.

The above-described embodiment and method provides scan-to-scan integration in a digital refresh memory of a raster scan radar to achieve improved sea clutter supression over that of a conventional long persistence phosphor PPI screen. More specifically, stationary or slowly moving targets generally appear bright due to their high correlation while sea clutter generally appears dim due to its low correlation from scan-to-scan. The scan-to-scan integration is readily made possible by true motion stabilizing the video memories so that return data from a stationary or slowly moving target is stored in the same memory location on successive scans even though own-ship has moved.

Those skilled in the art will understand that other apparatus could be used to provide operation equivalent to that of PAL 420 and PAL 421 of FIGS. 25 and 26, respectively. For example, rather than using FTI=1 to write VIDEO into $MK_{m+1}$, LTI=1 could be used to reset $MK_{m+1}$ to 0 such that the next $MK_{m+1}$ would take on the value of VIDEO. In such case, the OR of $MK_m$ and VIDEO would be used instead of $MK_{m+1}$ as an input for modifying video A and B memories 400 and 402.

In addition to the functions described heretofore, monitor interface receives VIDEO A, VIDEO B and synthetics SYN and combines them into a composite video for display on the screen 115 of monitor 112.

This concludes the description of the preferred embodiment. A reading of it by those skilled in the art will bring to mind many alterations and modifications without departing from the spirit and scope of the invention. Accordingly, it is intended that the invention be limited only by the appended claims.

What is claimed is:

1. In combination:
    a visual display;
    a memory having storage locations corresponding to pixels on said visual display;
    means for generating addresses for storing data in said memory, said data corresponding to echo signals received by scanning a plurality of azimuths of a scan, said generating means generating at least one of said memory addresses a plurality of times during said scan;
    means for providing composite data for said one memory address, said providing means comprising means for ORing all of the data corresponding with said one memory address which is received during said scan to provide said composite data; and
    means responsive to said composite data for updating the contents of said one memory address in said memory after said one memory address is generated for the last time during said scan.

2. The combination recited in claim 1 wherein said generating means comprises means for determining the first time said one memory address is generated during said scan.

3. The combination recited in claim 2 wherein said generating means further comprises means for determining the last time said one memory address is generated during said scan.

4. In combination:
    a first memory for storing, in range format, echo data received from an azimuth of a scan;
    a visual display;
    a second memory having storage location corresponding to pixels on said visual display;
    a scan converter for generating addresses for said second memory and, synchronous with the generation of each of said second memory addresses, for generating an address for reading corresponding echo data out of said first memory;
    said scan converter generating at least one of said second memory addresses a plurality of times during said scan;
    means for providing composite data in response to each echo data read out of said first memory corresponding to said one address of said second memory during a scan; and
    means responsive to said composite data for modifying the contents of said one memory address in said second memory.

5. The combination recited in claim 4 wherein said scan converter means comprises means for determining the first time said one second memory address is generated during said scan.

6. The combination recited in claim 4 wherein said scan converter comprises means for determining the last time said one second memory address is generated during said scan.

7. In combination:
    a first memory for storing in range format radar return data received from an azimuth of a scan;
    a visual display;
    a second memory having storage locations corresponding to pixels on said visual display;
    a scan converter for generating addresses for said second memory and synchronously with the generation of each of said second memory addresses, for generating an address for reading corresponding radar return data out of said first memory;
    said scan converter comprising means for generating a first control signal the first time one of said second memory addresses is generated during a scan;
    said scan converter further comprising means for generating a second control signal the last time said one memory address is generated during said scan;

means for providing resultant data in response to all of said return data read out of said first memory for said one second memory address during said scan;

means for reading the storage location in said second memory addressed by said one second memory address; and means for writing data into said storage location of said one second memory address in accordance with said resultant data and said data read out of said second memory.

8. In combination:

a first memory for storing in range format radar return data received from an azimuth of a scan;

a visual display;

a second memory having a plurality of storage locations corresponding to pixels on said visual display;

a scan converter for generating addresses for said second memory and synchronous to the generation of each of said second memory addresses, for generating an address for reading corresponding radar return data from said first memory;

said scan converter comprising means for generating a first control signal the first time one pixel corresponding address for said second memory is generated during a scan and for generating a second control signal the last time said one pixel corresponding address for said second memory is generated during a scan;

a third memory having storage locations corresponding to predetermined ones of said storage locations of said second memory;

means responsive to said first control signal for writing said radar return data into said third memory; and means responsive to said second control signal for modifying data stored in said second memory in accordance with said radar return data stored in said third memory.

9. The combination in accordance with claim 8 further comprising means responsive to the absence of said first control signal for reading data from said third memory, ORing it with radar return data read out of said first memory, and writing the result into said third memory.

10. The combination in accordance with claim 9 wherein said second memory has a plurality of said storage locations corresponding to at least one of said pixels and the data stored in said plurality of said storage locations corresponds to radar return data received for that pixel on a plurality of previous scans.

11. In combination:

a memory having storage locations addressable by x,y coordinate addresses;

a scan converter for converting data corresponding to echo signals received in polar coordinates from a plurality of azimuth angles of a scan into data signals having corresponding x,y coordinate addresses, said scan converter generating at least one of said x,y coordinate addresses a plurality of times during said scan;

said scan converter comprising means for generating a control signal the last time said one x,y coordinate address is generated during said scan;

means for ORing all of said data signals during said scan which correspond to said one x,y coordinate address to provide a composite signal for said one x,y coordinate address; and means responsive to said control signal and said composite signal for modifying the contents of the storage location of said memory addressed by said one x,y coordinate address.

12. The combination recited in claim 11 further comprising a visual display and means for refreshing said visual display in raster scan format with data from said memory.

13. The combination recited in claim 11 wherein said scan converter comprises means for generating a range addresses corresponding to echo signals for each x,y coordinate address generated.

14. The combination recited in claim 11 wherein said scan converter further comprises means for generating a second control signal the first time said one x,y coordinate address is generated during said scan.

15. In combination:

means for polar scanning a region along a plurality of successive azimuth angles for radar return signals;

a first memory for storing said radar return signals corresponding to their range and received azimuth angle;

means for sequentially generating cartesian coordinate addresses along said azimuth angles;

means synchronized with the generation of each of said cartesian coordinate addresses for generating a range address for reading a corresponding radar return signal from said first memory;

means for generating a first control signal the first time one of said cartesian coordinate addresses is generated during a scan of said scanning means;

means for generating a second control signal the last time said one cartesian coordinate address is generated during said scan;

a second memory having storage locations addressable by said generated cartesian coordinate addresses;

means responsive to said first control signal and all of the radar return signals read from said first memory in synchronism with said one cartesian coordinate address during said scan for providing a resultant signal, said providing means comprising a third memory having storage locations corresponding to at least some of said storage locations of said second memory; and means responsive to said second control signal for modifying the storage location of said second memory addressed by said one cartesian coordinate address in accordance with said resultant signal.

16. The method of generating x,y coordinates along successive azimuth sweeps of a polar scan having a plurality of sectors, comprising the step of:

offsetting the initial x,y coordinate of azimuth sweeps in predetermined ones of said plurality of sectors.

17. The method of generating x,y coordinates along successive azimuth sweeps through a plurality of sectors of a scan wherein the generation of said x,y coordinates along each of said azimuth sweeps is a function of its sector, comprising the step of:

offsetting in predetermined ones of said plurality of sectors the initial x,y coordinate from which x,y coordinates are generated along azimuth sweeps.

18. The method of generating x,y coordinates for scan converting polar coordinate data received along one azimuth sweep of a plurality of successive azimuth sweeps of a scan into cartesian coordinate format, comprising the steps of:

loading a first storage device with a first value corresponding to one of said x,y coordinates of the origin of said azimuth sweep;

loading a second storage device with a second value corresponding to the opposite of said one x,y coordinate of said origin of said azimuth sweep;

offsetting said first storage device by one coordinate unit; and successively incrementing said first storage device by one coordinate unit while synchronously incrementing said second storage device by a value corresponding to a trigonometric function.

19. The method of generating cartesian coordinates for scan converting polar coordinate data received along one azimuth sweep of a plurality of successive azimuth sweeps of a scan, comprising the steps of:

loading one of said cartesian coordinates corresponding to the origin of said one azimuth sweep into a first register;

loading the opposite coordinate of said one cartesian coordinate corresponding to said origin of said one azimuth sweep into a second register;

offsetting by one coordinate unit said first register as a function of the octant of said scan in which said azimuth sweep is located, said offsetting being executed in alternate ones of said octants; and repeatedly incrementing said first register by one coordinate unit while synchronously incrementing said second register by a trigonometric value.

20. The method recited in claim 19 wherein said trigonometric value is a function of said octant.

21. The method of generating sets of rectangular coordinates for scan converting to cartesian coordinates data received in polar coordinates along one azimuth of a plurality of successive azimuths of a polar scan, comprising the steps of:

offsetting a first register by one rectangular coordinate unit; and successively incrementing said first register by said one rectangular coordinate unit while synchronously incrementing a second register by a trigonometric value as a function of the octant of said azimuth in said polar scan.

22. Apparatus for generating x,y coordinates for scan converting polar coordinate data received along an azimuth sweep of a plurality of successive azimuth sweeps of a 360° scan to cartesian coordinates, comprising:

a first register for storing a value corresponding to one of said cartesian coordinates in first predetermined octants of said scan and for storing a value corresponding to the opposite cartesian coordinate in second predetermined octants of said scan;

a second register for storing a value corresponding to said opposite cartesian coordinate in said second predetermined octants and for storing said one cartesian coordinate in said first predetermined octants;

means for loading into said first register a value corresponding to the coordinate origin of said azimuth sweep of the octant dependent coordinate to be stored in said first register;

means for loading into said second register a value corresponding to the coordinate origin of said azimuth sweep of the octant dependent coordinate to be stored in said second register;

means for offsetting said first register by a coordinate unit in alternate octants; and means for incrementing said first register by said coordinate unit while incrementing said second register by a trigonometric value of a coordinate unit as a function of the octant of said azimuth sweep.

23. The method of generating rectangular coordinates for scan converting polar coordinate data received from a plurality of successive azimuth sweeps of a radar scan, comprising the steps of:

offsetting in alternate octants of said scan one coordinate of a pair of rectangular coordinates corresponding to the origin of said azimuth sweeps; and generating pairs of rectangular coordinates along said azimuth sweeps.

24. The method recited in claim 23 wherein said offsetting corresponds to one coordinate unit in a direction away from said azimuth sweep.

25. The method of generating rectangular coordinates for scan converting data received from a plurality of successive azimuth sweeps of a scan, comprising the steps of:

offsetting one coordinate of a pair of rectangular coordinates corresponding to the origin of one of said azimuth sweeps of said scan, said offsetting being a function of the sector of said one azimuth sweep; and generating pairs of rectangular coordinates from said offset pair of coordinates along said azimuth sweep by sequentially incrementing said one coordinate by a coordinate unit and synchronously incrementing the opposite coordinate by a trigonometric fraction of a coordinate unit as a function of said sector.

26. The method recited in claim 25 wherein said offsetting is by one coordinate unit in predetermined ones of said sectors in a direction opposite said azimuth sweep and by zero coordinate units in alternate sectors of said predetermined sectors.

27. The method of generating rectangular coordinates for scan converting polar coordinate data received along a plurality of successive azimuth sweeps of a radar scan, comprising the steps of:

generating a pair of rectangular coordinates corresponding to the origin of one of said azimuth sweeps;

offsetting one coordinate of said pair of coordinates in response to said azimuth sweep being in predetermined sectors of said scan; and generating pairs of rectangular coordinates from said offset along the azimuth of said azimuth sweep.

28. The method recited in claim 27 wherein said generating from said offset pair of coordinates is provided by sequentially incrementing said one coordinate by a coordinate unit and synchronously incrementing the opposite coordinate by a trigonometric value determined as a function of said sector.

29. The method recited in claim 27 wherein said sectors define 45° octants.

30. The method of generating x,y coordinates for scan converting polar coordinate data received from a plurality of azimuth sweeps of a radar scan divided into eight 45° octants, comprising the steps of:

offsetting as a function of the octant of said octants in which one of said azimuth sweeps is located one coordinate of a pair of rectangular coordinates corresponding to the origin of said one azimuth sweep; and generating x,y coordinates along said one azimuth sweep from said offset pair of coordinates by incrementing said one coordinate by a coordinate unit and synchronously incrementing the opposite coordinate by a value trigonometrically corresponding to said coordinate unit as a function of said octant of said one azimuth sweep.

31. The method recited in claim 30 wherein the sign of incrementing said x and y coordinates is a function of said octant of said one azimuth sweep.

32. The method of generating rectangular coordinates for scan converting polar coordinate data received at a plurality of successive azimuth sweeps of a radar scan divided into sectors, comprising the steps of:
for each of said azimuths in a first sector of said sectors, offsetting one coordinate of a pair of coordinates corresponding to the origin of each of said azimuth sweeps in said first sector, said offsetting being equivalent to one coordinate unit;
for each of said azimuth sweeps in said first sector, generating pairs of coordinates along each of said azimuth sweeps in said first sector from said offset by incrementing said one coordinate by a coordinate unit while synchronously incrementing the opposite coordinate by a fraction of a coordinate unit as a function of a trigonometric value as a function of said first sector;
for each of said azimuth sweeps in a second sector bordering said first sector, generating pairs of coordinates along each of said azimuth sweeps in said second sector from a pair of coordinates respectively corresponding to the origin of said azimuth sweeps in said second sector.

33. The method of generating rectangular coordinates for scan converting polar coordinate data received from a plurality of azimuth sweeps of a radar scan divided into 45° octants, comprising the steps of:
offsetting in alternate ones of said octants one of the coordinates of a pair of coordinates corresponding to the origin of each of said azimuth sweeps in said alternate octants; and
generating pairs of coordinates at the azimuths of said azimuth sweeps around said scan by incrementing from said origin offsets in said alternate octants and by incrementing in the other octants from pairs of coordinates corresponding to the origin of said respective azimuth sweeps in the octants other than said alternate octants.

* * * * *